Aug. 8, 1950 J. WICKS 2,518,210

RESTRICTED SERVICE AUTOMATIC TELEPHONE SYSTEM

Filed March 29, 1947 3 Sheets-Sheet 1

INVENTOR.
John Wicks

BY

Davis, Lindsey, Smith & Shonts

Attorneys

Aug. 8, 1950 J. WICKS 2,518,210

RESTRICTED SERVICE AUTOMATIC TELEPHONE SYSTEM

Filed March 29, 1947 3 Sheets-Sheet 2

Inventor
John Wicks
By
Davis, Lindsey, Smith & Shonts
Attorneys

Aug. 8, 1950 J. WICKS 2,518,210

RESTRICTED SERVICE AUTOMATIC TELEPHONE SYSTEM

Filed March 29, 1947 3 Sheets-Sheet 3

INVENTOR.
John Wicks

BY Davis, Lindsey, Smith & Shonts

Attorneys

Patented Aug. 8, 1950 2,518,210

UNITED STATES PATENT OFFICE 2,518,210

RESTRICTED SERVICE AUTOMATIC TELEPHONE SYSTEM

John Wicks, Biloxi, Miss., assignor to Automatic Electric Laboratories, Inc., Chicago, Ill., a corporation of Delaware Application March 29, 1947, Serial No. 738,116

10 Claims. (Cl. 179—18)

Figure 1:
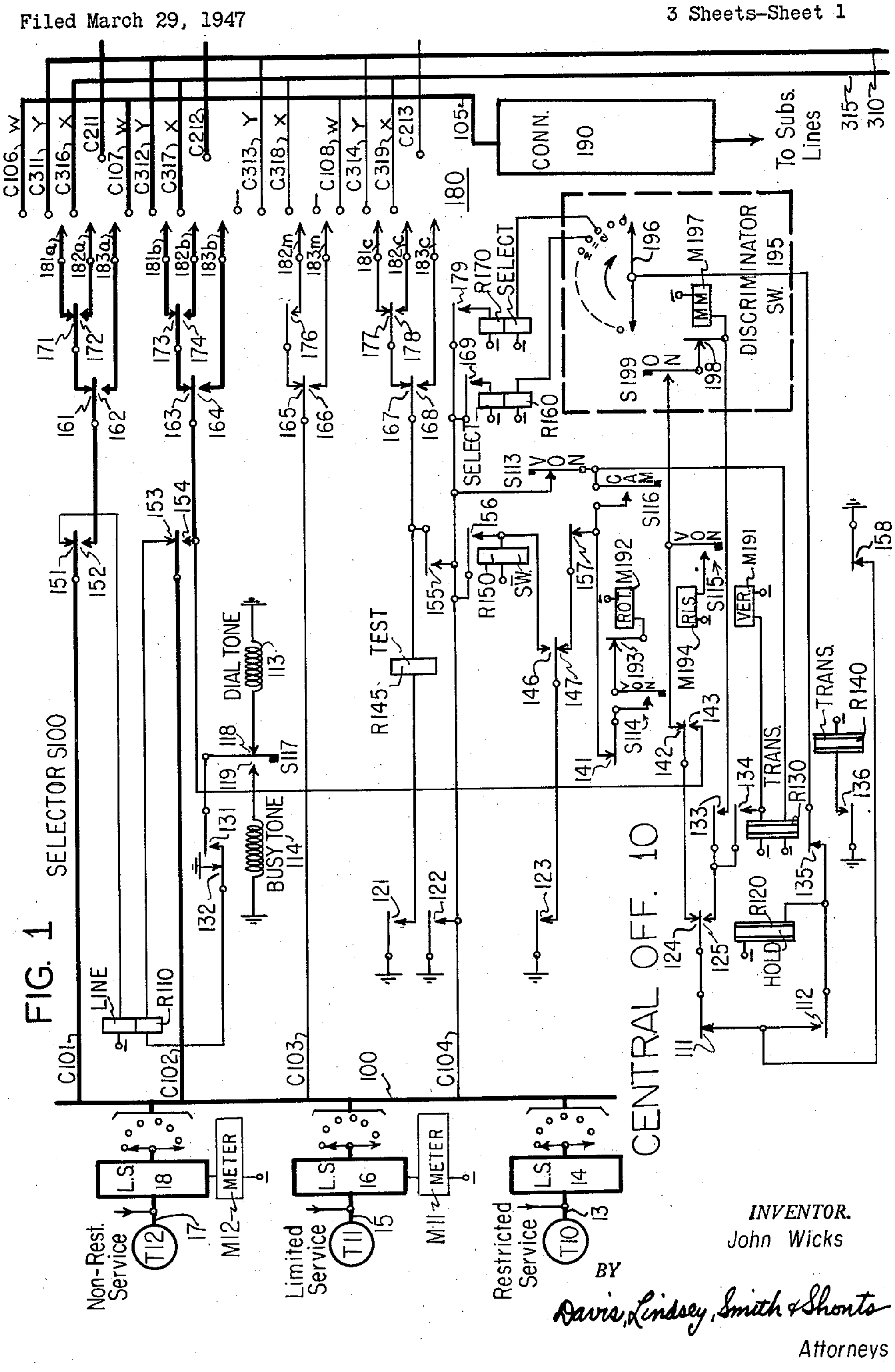

The present invention relates to automatic telephone systems and more particularly to such systems in which different groups of subscriber substations are rendered corresponding different classes of service.

In an automatic telephone system serving a central office area and the adjacent suburban areas, calls from the subscriber substations in the central office area that are to be completed to subscriber substations in the suburban areas are usually first extended to an operator switchboard in the central office area and then routed by the operators thereat to the subscriber substations in the suburban areas. While this system is entirely satisfactory in operation, a large switchboard in the central office, staffed by a great number of operators, is required in order to complete the calls from the central office area to the suburban areas.

Accordingly, it is an object of the present invention to provide an automatic telephone system comprising an improved switching arrangement; whereby subscriber substations arranged in a first group in the central office are rendered a first class of service permitting them to set up connections for any desired time interval to subscriber substations in the suburban areas; subscriber substations arranged in a second group in the central office are rendered a second class of service permitting them to set up connections for a limited time interval to subscriber substations in the suburban areas; and subscriber substations arranged in a third group in the central office are rendered a third class of service preventing them from setting up connections to subscriber substations in the suburban areas.

Another object of the invention is to provide an automatic telephone system in which different classes of service are rendered to the subscriber substations; wherein the classes of service are selectively established by an improved arrangement including different types of digit transmitting mechanism disposed at the subscriber substations.

Another object of the invention is to provide an automatic telephone system in which different classes of service are rendered to subscriber substations; wherein the class of service rendered to a given calling subscriber substation is determined by a unique control transmitted by the digit transmitting mechanism incident to a standard operation thereof.

A further object of the invention is to provide an automatic telephone system of the type noted that comprises improved switching apparatus which is selectively responsive to the unique controls transmitted from the different classes of subscriber substations in order to render thereto the corresponding classes of service.

A further object of the invention is to provide switching apparatus of the type noted that incorporates an improved wiper switching arrangement which is utilized for the purpose mentioned.

A still further object of the invention is to provide in an automatic telephone system of the type noted an improved trunk circuit that is selectively responsive to seizure thereof over two incoming channels thereto by a preceding switch to render to a subscriber substation connected to the preceding switch a corresponding class of service.

Further features of the invention pertain to the particular arrangement of the circuit elements of the system, whereby the above-outlined and additional operating features thereof are attained.

Figure 2:
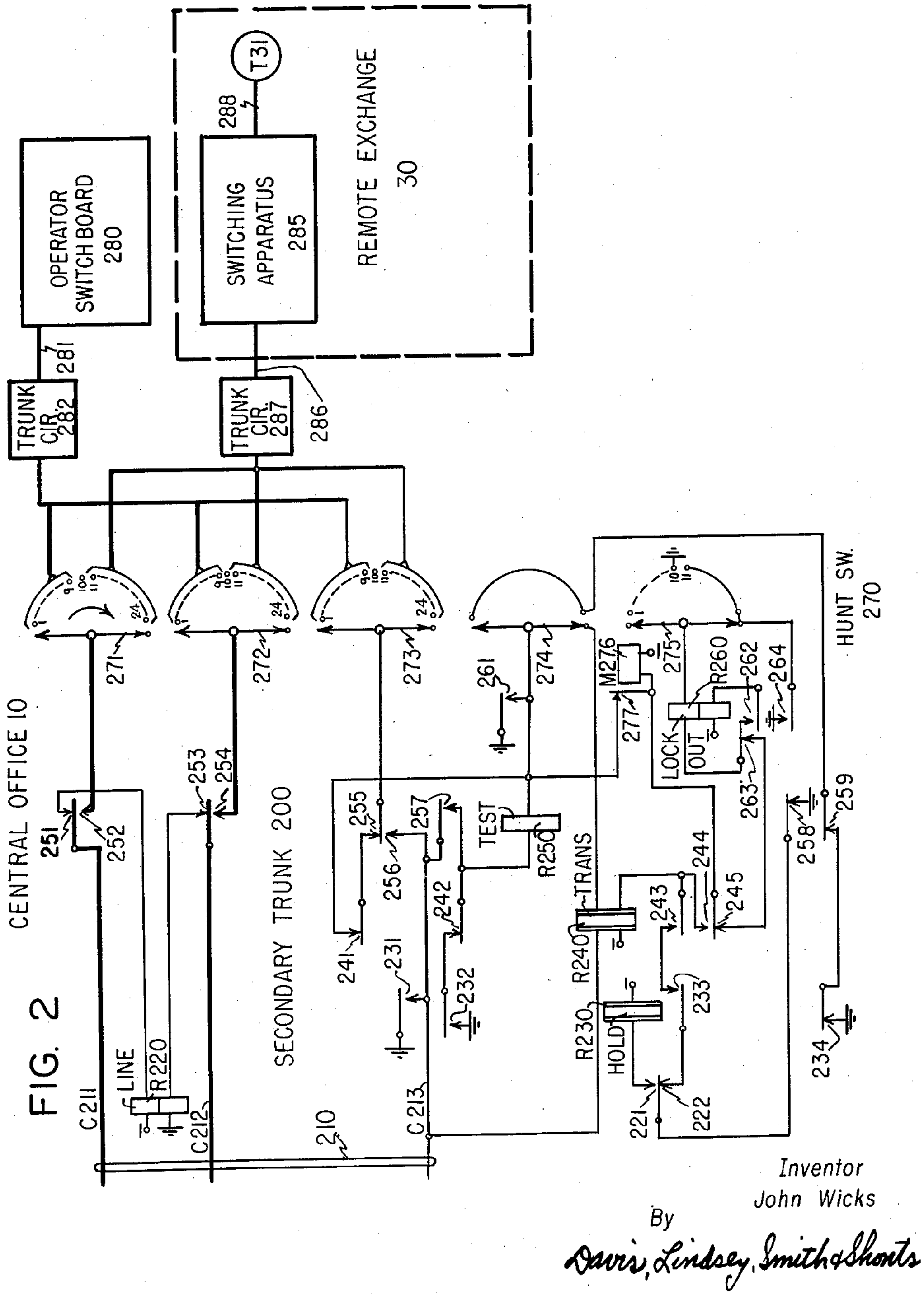
Figure 3:
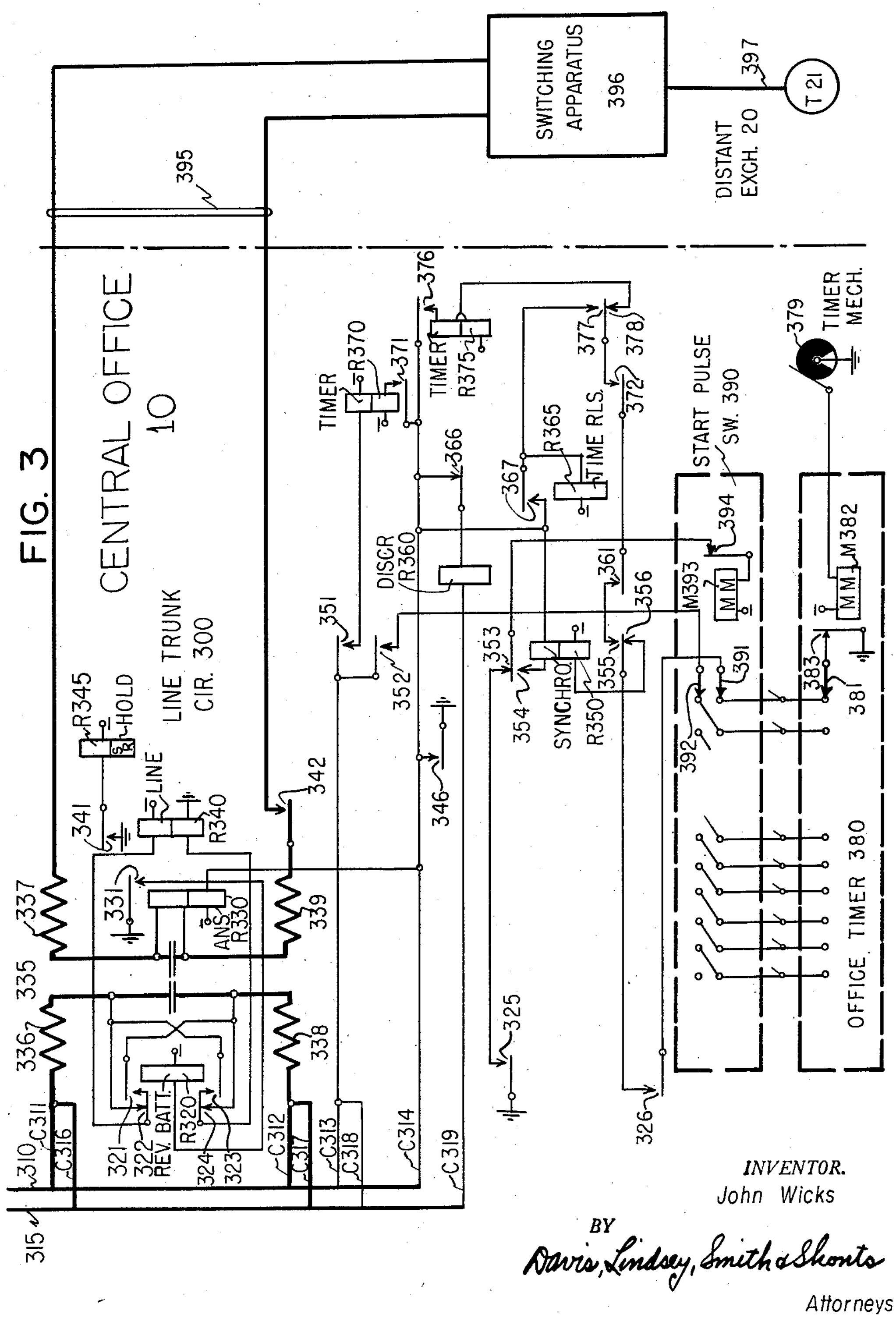

The invention, both as to its organization and method of operation, together with further objects and advantages thereof, will best be understood by reference to the following specification taken in connection with the accompanying drawings in which Figures 1 to 3, inclusive, taken together, illustrate the details of an automatic telephone system having incorporated therein the feature of the present invention. More particularly, Figs. 1 and 2 should be arranged from left to right in end-to-end relations; and Fig. 3 should be arranged longitudinally below Fig. 2.

Referring now more particularly to Figs. 1 to 3, inclusive, of the drawings, there is illustrated an automatic telephone system comprising a central office 10, a distant exchange 20 and a remote exchange 30. The central office 10 is connected to the distant exchange 20 by a group of ten trunk lines, including the trunk line 395; and the central office 10 is connected to the remote exchange 30 by a group of fourteen trunk lines, including the trunk line 286.

The central office 10 may serve a group of several hundred subscriber substations rendered three individual classes of service, including non-restricted service, limited service and restricted service. A first group of subscriber substations, including the subscriber substation T12, is rendered non-restricted service; a second group of subscriber substations, including the subscriber substation T11, is rendered limited service; and a third group of subscriber substations, including the subscriber substation T10, is rendered restricted service. Each subscriber substation is provided with substation apparatus and is connected by an associated subscriber line to a line switch individual thereto. The subscriber substation T12 is connected by the associated subscriber line 17 to the line switch 18 individual thereto; the subscriber substation T11 is connected by the associated subscriber line 15 to the line switch 16 individual thereto; and the subscriber substation T10 is connected by the associated subscriber line 13 to the line switch 14 individual thereto. Each of the subscriber substations rendered non-restricted service and each of the subscriber substations rendered limited service is provided with a meter individual thereto which is connected to the associated line switch. The meter M11 is individual to the subscriber substation T11 and is connected to the individually associated line switch 16; while the meter M12 is individual to the subscriber substation T12 and is connected to the individually associated line switch 18. Each subscriber substation rendered non-restricted service, such, for example, as the subscriber substation T12, also comprises a dial having ten ordinary digit finger holes therein and an eleventh digit finger hole which may be utilized in order to cause the dial to transmit a series of twelve impulses in a continuous group and constituting the digit Y; each subscriber substation rendered limited service, such, for example, as the subscriber substation T11, also comprises a dial having ten ordinary digit finger holes therein and an eleventh digit finger hole which may be utilized in order to cause the dial to transmit a series of eleven impulses in a continuous group and consitituting the digit X; and each subscriber substation rendered restricted service, such, for example, as the subscriber substation T10, also comprises a dial of conventional construction having ten ordinary digit finger holes therein.

Further, the central office 10 comprises a plurality of groups of selectors, each serving a group of one hundred of the subscriber lines; the first group of selectors, including the selector S100, serves the first group of one hundred subscriber lines, including the subscriber lines 13, 15 and 17 respectively extending to the subscriber substations T10, T11 and T12, and is accordingly accessible, by way of a trunk 100 extending thereto, to the respectively associated line switches 14, 16 and 18. Also, the central office 10 comprises a plurality of groups of connectors accessible to the selectors in the groups and having access to the corresponding groups of one hundred subscriber lines; the first group of connectors, including the connector 190, serves the first group of one hundred subscriber lines, including the subscriber lines 13, 15 and 17, previously mentioned.

Also, the central office 10 comprises a group of trunk circuits terminating the trunk lines in the group extending to the distant exchange 20, the trunk circuit 300 terminating the trunk line 395; and another group of trunk circuits terminating the trunk lines in the group extending to the remote exchange 30, the trunk circuit 287 terminating the trunk line 286; and an operator switchboard 280. The operator switchboard 280 terminates a group of nine trunks, including the trunk 281, terminated by a further group of trunk circuits, including the trunk circuit 282; the trunk 281 being terminated by the trunk circuit 282. Also, the central office 10 comprises a group of secondary trunks, including the secondary trunk 200. Each of the trunk circuits in the group, including the trunk circuit 300, is provided with two incoming trunks or channels accessible to the selectors in the different groups; the trunk circuit 300 being provided with the incoming trunks 310 and 315 accessible to the selector S100 in the first group. Each of the secondary trunks in the group, including the secondary trunk 200, is provided with an incoming trunk accessible to the selectors in the different groups; the secondary trunk 200 being provided with the incoming trunk 210 accessible to the selector S100 in the first group. Each of the trunk circuits in the group, including the trunk circuit 287, is accessible to the hunt switches incorporated in the secondary trunks 200, etc.; and each of the trunk circuits in the group, including the trunk circuit 282, is accessible to the hunt switches incorporated in the secondary trunks 200, etc.

The distant exchange 20 is of the automatic type comprising automatic switching apparatus 396 and serving a plurality of subscriber substations, including the subscriber substation T21 having the subscriber line 397 extending thereto. Similarly, the remote exchange 30 is of the automatic type comprising automatic switching apparatus 285 and serving a plurality of subscriber substations, including the subscriber substation T31 having the subscriber line 288 extending thereto.

Preferably, in the central office 10 each of the selectors is identical to the selector S100 that comprises, as shown in Fig. 1, a Strowger mechanism 180 including a wiper carriage supporting three sets of wipers and provided with three individually associated contact bank sections. The first wiper set comprises the three wipers 181*a*, 181*b* and 181*c*; the second wiper set comprises the four wipers 182*a*, 182*b*, 182*c* and 182*m*; and the third wiper set comprises the four wipers 183*a*, 183*b*, 183*c* and 183*m*. Also, the Strowger mechanism 180 comprises a vertical magnet M191, a rotary magnet M192 and a release magnet M194. Associated with the wiper carriage of the Strowger mechanism 180 are three sets of switch springs S113, S114 and S115 which are actuated when the wiper carriage is driven in the vertical direction away from its home position; as well as two sets of switch springs S116 and S117 which are actuated when the wiper carriage of the Strowger mechanism 180 is driven eleven steps in the rotary direction away from its home position. Also, the selector S100 comprises a relay group including a line relay R110, a hold relay R120, two transfer relays R130 and R140, a test relay R145, a switch relay R150 and two select relays R160 and R170. Further, the selector S100 also comprises a discriminator switch 195 of the rotary type, including a double-ended wiper 196 provided with an associated contact bank and a magnet M197 for driving the wiper 196 step by step in the clockwise direction. Associated with the wiper 196 is a set of switch springs S199 which is actuated when the wiper noted is driven away from its home position.

Preferably, each of the secondary trunks is identical to the secondary trunk 200 which comprises, as shown in Fig. 2, a relay group including a line relay R220, a hold relay R230, a transfer relay R240, a test relay R250 and a lockout relay R260; as well as a hunt switch 270. The hunt switch 270 is of the rotary type including five wipers 271 to 275, inclusive, provided with individually associated contact banks, and a magnet M276 for driving the wipers noted step by step in the clockwise direction away from their home positions.

Preferably, each of the trunk circuits terminating the trunk lines extending between the central office 10 and the distant exchange 20 is identical to the trunk circuit 300 which comprises, as shown in Fig. 3, a repeater 335 and a relay group including a reverse battery relay R320, an answer relay R330, a line relay R340, a hold relay R345, a synchronizing relay R350, a discriminating relay R360, a time release relay R365, and two timer relays R370 and R375. Also, the trunk circuit 300 comprises a start pulse switch 390 of the rotary type, including two wipers 391 and 392 and a magnet M393 for driving the wipers noted step by step from their last operated position.

Further, the central office 10 comprises an office timer 380 of the rotary type, including a wiper 381 provided with a magnet M382 for driving the wiper noted step by step from its last operated position; as well as a timer mechanism 379. The timer mechanism 379 is connected to the office timer 380 and provides ground pulses thereto continuously at the expiration of each predetermined unit time interval; while the office timer 380 is commonly connected to the start pulse switches 390, etc., in the various trunk circuits 300, etc. The arrangement of the office timer switch 380 and the start pulse switches 390, etc., described more fully hereinafter, is the same as that disclosed in U. S. Patent No. 1,810,330, granted on June 16, 1931 to John Wicks.

In the central office 10 the connectors in the various groups, such, for example, as the connector 190 in the first one hundred line group, are of conventional Strowger construction, while the line switches 14, 16, 18, etc. are of standard construction. Also, the trunk circuits 287, etc. and 282, etc. in the respective groups may be of any suitable type. Finally, the operator switchboard 280 may be of any suitable type.

Furthermore, in the distant exchange 20 the switching apparatus 396 may be of any well known type, such, for example, as Strowger apparatus; and in the remote exchange 30 the switching apparatus 285 may be of any well known type, such, for example, as Strowger apparatus.

*Local calls in the central office 10*

Now assume that a call has been initiated at any subscriber substation in the central office 10, such, for example, as the subscriber substation T10; when the call is initiated at the calling subscriber substation T10 the individually associated line switch 14 is controlled over the associated subscriber line 13 and operates to find a trunk extending to an idle selector, such, for example, as the trunk 100 extending to the selector S100. The selector S100 is marked as idle to the line switch 14 by the application of battery potential by way of the lower winding of the transfer relay R130 and the set of switch springs S113 to the control conductor C104 of the trunk 100. Also, the line switch 14 operates to mark the subscriber line 13 extending to the calling subscriber substation T10 as busy to the connectors in the group, including the connector 190, having access thereto. When the trunk 100 is thus selected by the line switch 14, a loop circuit is completed from the calling subscriber substation T10 by way of the associated subscriber line 13, the line switch 14 and the line conductors C101 and C102 of the trunk 100 to the line relay R110 in the selector S100. More particularly, ground potential is applied by way of the contacts 132, the lower winding of the line relay R110 and the contacts 153 to the line conductor C102 of the trunk 100; and battery potential is applied by way of the upper winding of the line relay R110 and the contacts 151 to the line conductor C101 of the trunk 100. When this loop circuit is thus completed the line relay R110 operates to complete, at the contacts 112, a circuit including the contacts 158 for operating the hold relay R120. Upon operating, the hold relay R120 completes, at the contacts 122, an obvious path for applying ground potential to the control conductor C104 of the trunk 100, thereby to complete a circuit including the set of switch springs S113 for energizing the lower winding of the transfer relay R130 in order to cause the latter relay to operate. Also, the application of ground potential to the control conductor C104 retains the line switch 14 in its operated position and marks the trunk 100 as busy to the other line switches 16, 18, etc. Upon operating, the transfer relay R130 completes, at the contacts 136, an obvious circuit for operating the transfer relay R140. Also, the transfer relay R130 completes, at the contacts 131, an alternative path, including the contacts 118 of the set of switch springs S117 and the winding of the dial tone transformer 113, for applying ground potential by way of the lower winding of the line relay R110 to the line conductor C102 of the trunk 100; and interrupts, at the contacts 132, the previously traced original path for applying direct ground potential by way of the lower winding of the line relay R110 to the line conductor C102 of the trunk 100. Accordingly, at this time the loop circuit extending between the calling subscriber substation T10 and the line relay R110 in the selector S100 includes the winding of the dial tone transformer 113, whereby dial tone current is returned thereover, indicating to the subscriber at the calling subscriber substation T10 that he may begin the dialing of the first digit of the directory number of the called subscriber substation in the central office 10.

Now assuming that the call is to be extended to the subscriber substation T11 in the central office 10, the subscriber at the calling subscriber substation T10 dials the first digit 0 of the directory number of the called subscriber substation T11, whereby the line relay R110 in the selector S100 follows the impulses of the first digit mentioned. Each time the line relay R110 restores and then reoperates it interrupts and then recompletes, at the contacts 112, the previously traced circuit for maintaining operated the hold relay R120, thereby to maintain the latter relay in its operated position during dialing since it is of the slow-to-release type. Also, each time the line relay R110 restores and then reoperates it completes and then interrupts, at the contacts 111, a circuit, including the contacts 158, 125 and 134, for energizing in multiple the upper winding of the transfer relay R130 and the vertical magnet M191 of the Strowger mechanism 180, thereby to maintain operated the transfer relay R130 subsequent to the interruption of the previously traced circuit for energizing the lower winding thereof, since the transfer relay R130 is of the slow-to-release type. Accordingly, the vertical magnet M191 operates and restores ten times, driving the wiper carriage of the Strowger mechanism 180 ten steps in the vertical direction away from its home position. When the wiper carriage of the Strowger mechanism 180 is driven one step in the vertical direction away from its home position, the sets of switch springs S113, S114 and S115 are actuated. More particularly, the set of switch springs S113 is actuated into disengagement, thereby to interrupt the previously traced circuit for energizing the lower winding of the transfer relay R130, whereby the latter relay is maintained in its operated position only during dialing of the first digit. The sets of switch springs S114 and S115 are actuated into engagement respectively to prepare circuits, traced hereinafter, for operating the rotary magnet M192 and the release magnet M194 of the Strowger mechanism 180. Finally, each time the line relay R110 restores and then reoperates it completes and then interrupts, at the contacts 111, a multiple circuit, including the contacts 158, 125 and 133, for operating the magnet M197 of the discriminator switch 195, whereby the wiper 196 thereof is stepped ten steps in the clockwise direction away from its home position. When the wiper 196 of the discriminator switch 105 is driven one step in the clockwise direction away from its home position, the set of switch springs S199 is actuated into engagement, for a purpose more fully explained hereinafter.

At the conclusion of the first digit the line relay R110 is maintained in its operated position, thereby to retain operated the hold relay R120 and to retain interrupted, at the contacts 111, the multiple circuits for energizing the upper winding of the transfer relay R130 and for energizing the vertical magnet M191 of the Strowger mechanism 180, and for energizing the magnet M197 of the discriminator switch 195. Also at this time the wiper carriage of the Strowger mechanism 180 occupies its tenth stepped position in the vertical direction, whereby the three wiper sets are disposed in vertical alignment with respect to the three associated sections of the contact bank but in rotary offset position with respect thereto. Moreover, at this time the wiper 196 of the discriminator switch 195 occupies its tenth rotary stepped position engaging the tenth contact in the associated contact bank; which contact is not wired to any controlled circuit, as explained more fully hereinafter. Shortly following the conclusion of the first digit, the transfer relay R130 restores to interrupt, at the contacts 131, the previously traced path for connecting dial tone current into the loop circuit extending between the selector S100 and the calling subscriber substation T10, and to recomplete, at the contacts 132, the previously traced original loop circuit extending between the selector S100 and the calling subscriber substation T10. Also, upon restoring, the transfer relay R130 interrupts, at the contacts 136, the previously mentioned circuit for maintaining operated the transfer relay R140, thereby to cause the latter relay to restore shortly thereafter since it is of the slow-to-release type.

Upon restoring, the transfer relay R140 completes, at the contacts 141, a circuit, including the contacts 123, 147, 157 and 193 and the set of switch springs S114, for operating the rotary magnet M192 of the Strowger mechanism 180. Upon operating, the rotary magnet M192 interrupts, at the contacts 193, the operating circuit therefor, whereby the rotary magnet M192 restores to recomplete, at the contacts 193, the operating circuit therefor. Accordingly, the rotary magnet M192 operates buzzer fashion in order to drive the wiper carriage of the Strowger mechanism 180 step by step in the rotary direction until a trunk extending to an idle connector in the previously selected group is selected by the first wiper set supported by the wiper carriage thereof. Assuming that the trunk 105 extending to the connector 190 is the first idle trunk in the previously selected group, the rotary magnet M192 operates and restores intermittently in order to drive the wiper carriage in the rotary direction until the first wiper set, including the wipers 181*a*, 181*b* and 181*c* engage the contacts in the first section of the associated contact bank terminating the conductors C106, C107 and C108 of the trunk 105; the trunk 105 being marked as idle to the selector S100 by the application of battery potential to the control conductor C108 thereof. When the selector S100 operates in the above described manner to select the trunk 105 extending to the connector 190, a circuit, including the contacts 121, 167 and 177, the control wiper 181*c* of the first wiper set, and the control conductor C108 of the trunk 105, is completed for operating the test relay R145. Upon operating, the test relay R145 interrupts, at the contacts 147, the previously traced circuit for operating intermittently the rotary magnet M192 of the Strowger mechanism 180; and completes, at the contacts 146, a circuit including the contacts 123 for operating the switch relay R150. Upon operating, the switch relay R150 completes, at the contact 156, a holding circuit, including the contacts 122, for maintaining itself operated; and completes, at the contacts 155, a path, including the contacts 122, 167 and 177, for applying ground potential to the control wiper 181*c* of the first wiper set in order to cause ground potential to be applied to the control conductor C108 of the trunk 105, thereby to effect seizure of the connector 190. Also, the switch relay R150 interrupts, at the contacts 151 and 153, the previously traced loop circuit extending between the calling subscriber substation T10 and the line relay R110 in the selector S100; and completes, at the contacts 152 and 154, an alternative loop circuit extending between the calling subscriber substation T10 and the connector 190. The alternative loop circuit mentioned extends from the line conductors C101 and C102 of the trunk 100 by way of the contacts 152, 154, 161, 163 and 171, 173, the line wipers 181*a* and 181*b* of the first wiper set and the line conductors C106 and C107 of the trunk 105. When the above-traced original loop circuit extending between the calling subscriber substation T10 and the line relay R110 in the selector S100 is thus interrupted, the line relay R110 restores; and finally, upon operating, the switch relay R150 interrupts, at the contacts 158, the previously traced circuit for maintaining operated the hold relay R120, whereby the latter relay restores shortly thereafter it being of the slow-to-release type. Also, upon operating, the switch relay R150 completes, at the contacts 155, a path, including the contacts 121 and 122, for short-circuiting the winding of the test relay R145 in order to cause the latter relay to restore. At this time the selector S100 has operated to select the trunk 105 extending to the connector 190, and the switch relay R150 in the selector S100 is retained in its operated position by virtue of a completed holding circuit therefor, including the grounded control conductor C108 of the trunk 105; ground potential in the connector 190 being applied to the control conductor C108 of the trunk 105 subsequent to the seizure of the connector 190. The path mentioned extends from the grounded control conductor C108 of the trunk 105 by way of the control wiper 181*c* of the first wiper set the contacts 177, 167, 155 and 156, and the winding of the switch relay R150 to battery.

At this time the connector 190 is rendered responsive to the second and third digits of the directory number of the called subscriber substation T11; which digits are dialed at the calling subscriber substation T10 in order to cause operation of the connector 190 to select the subscriber line 15 extending to the called subscriber substation T11. The subsequent operation of the connector 190 depends upon the idle or busy condition of the called subscriber substation T11 and takes place in a conventional manner. Assuming that the called subscriber substation T11 is idle at this time the connector 190 operates when the call is answered at the called subscriber substation T11 to complete a telephone connection thereto from the calling subscriber substation T10. Also the connector 190 operates to mark the subscriber line 15 extending to the called subscriber substation T11 as busy to the other connectors in the same group having access thereto.

Subsequently, at the conclusion of the connection, when the subscriber at the calling subscriber substation T10 replaces the receiver of the telephone instrument thereat upon its associated switchhook, the loop circuit extending therefrom by way of the line switch 14 and the selector S100 to the connector 190 is interrupted, thereby to bring about the release of the connector 190; whereby the subscriber line 15 extending to the called subscriber substation T11 is marked as idle to the connectors in the same group having access thereto, assuming that the subscriber at the called subscriber substation T11 has replaced the receiver of the telephone instrument thereat upon its associated switchhook at this time. When the connector 190 is thus released ground potential is removed from the control conductor C108 of the trunk 105, thereby to interrupt the previously traced circuit for maintaining operated the switch relay R150 in the selector S100. Upon restoring, the switch relay R150 completes, at the contacts 158, a circuit, including the contacts 111, 124 and 142, and the set of switch springs S115, for operating the release magnet M194, whereby the wiper carriage of the Strowger mechanism 180 is released and returned to its home position. When the Strowger mechanism 180 is thus released, the sets of switch springs S113, S114 and S115 are actuated. More particularly, the set of switch springs S113 is actuated into engagement, thereby to complete the previously traced path for applying battery potential by way of the lower winding of the transfer relay R130 to the control conductor C104 of the trunk 100; and the set of switch springs S115 is actuated into disengagement, thereby to interrupt the above-traced circuit for operating the release magnet M194 of the Strowger mechanism 180. Also, upon restoring, the switch relay R150 completes, at the contacts 158, a multiple circuit, including the contacts 111, 124 and 142, the set of switch springs S199, and the contacts 198, for operating the magnet M197 of the discriminator switch 195. Upon operating, the magnet M197 interrupts, at the contacts 198, the operating circuit therefor, whereby the magnet M197 restores in order to recomplete, at the contacts 198, the operating circuit therefor. Accordingly, the magnet M197 operates buzzer fashion, thereby to drive the wiper 196 of the discriminator switch 195 step by step in the clockwise direction back into its home position. When the wiper 196 of the discriminator switch 195 is driven back into its home position, the set of switch springs S199 is actuated into disengagement, thereby to interrupt the above-traced circuit for operating the magnet M197. At this time the selector S100 is completely released and marked as idle, by the application of battery potential to the control conductor C104 of the trunk 100, to the line switches 14, 16, 18, etc. When ground potential is removed from and battery potential is reapplied to the control conductor C104 of the trunk 100, the line switch 14 is restored in order to mark the subscriber line 13 extending to the subscriber substation T10 as idle to the connectors in the group, including the connector 190, having access thereto.

*Trunk calls from the central office 10 to the distant exchange 20*

At the outset it is noted that the subscriber substations rendered restricted service, such, for example, as the subscriber substation T10 in the central office 10, are not permitted to extend connections to the distant exchange 20, and specifically that such stations do not have facility for controlling operation of the selectors S100, etc. in order to bring about this result, as explained more fully hereinafter in conjunction with the extension of connections from subscriber substations rendered non-restricted service and subscriber substations rendered limited service in the central office 10. Specifically, a subscribed substation rendered restricted service, such for example, as the subscriber substation T10 in the central office 10, must first extend a connection to the operator switchboard 280 in the central office 10, in a manner more fully explained hereinafter, and permit the operator at the switchboard 280 to complete the connection to a called subscriber substation in the distant exchange 20.

Considering now the extension of a call from a subscriber substation rendered non-restricted service, such, for example, as the subscriber substation T12 in the central office 10, to a called subscriber substation, such, for example, as the subscriber substation T21 in the distant exchange 20, the subscriber at the calling subscriber substation T12 first initiates the call in order to control the line switch 18 over the associated subscriber line 17, whereby the line switch 18 selects a trunk extending to an idle selector, such, for example, as the trunk 100 extending to the selector S100. The subscriber at the calling subscriber substation T12 then dials the first digit Y of the directory number of the called subscriber substation T21 in the distant exchange 20. It will, of course, be understood that the subscriber at the calling subscriber substation T12 merely operates the dial thereat utilizing the eleventh digit finger hole therein, whereby the dial mentioned causes twelve impulses in a group to be transmitted therefrom over the subscriber line 17, the line switch 18 and the trunk 100 to the selector S100. The selector S100 responds to the digit Y in a manner substantially identical to that previously explained. However, since the Strowger mechanism 180 is capable of only ten steps in the vertical direction, the eleventh and twelfth impulses transmitted to the vertical magnet M191 thereof are without effect and, in fact, the wiper carriage of the Strowger mechanism 180 is driven ten steps in the vertical direction away from its home position. However, the magnet M197 of the discriminator switch 195 is capable of responding to the eleventh and twelfth impulses of the digit Y, in order to cause the wiper 196 thereof to engage the twelfth contact in the associated contact bank terminating the conductor extending to the lower winding of the selector relay R170. Accordingly, in the present example, at the conclusion of the first digit Y, when the transfer relay R130 restores, it completes, at the contacts 135, a circuit in multiple to the winding of the hold relay R120 and including the contacts 158 and 112 for applying ground potential to the wiper 196 of the discriminator switch 195. This application of ground potential to the wiper 196 of the discriminator switch 195 completes an obvious circuit for energizing the lower winding of the select relay R170, thereby to cause the latter relay to operate and complete, at the contacts 179, a holding circuit, including the contacts 122, for energizing the upper winding thereof. Also, the switch relay R170 interrupts, at the contacts 171, 173 and 177, the previously traced connections between the selector S100 and the wipers 181*a*, 181*b* and 181*c* of the first wiper set of the Strowger mechanism 180; and completes, at the contacts 172, 174, 176 and 178, connections between the selector S100 and the wipers 182*a*, 182*b*, 182*m* and 182*c* of the second wiper set of the Strowger mechanism 180. Shortly following the restoration of the transfer relay R130, the transfer relay R140 restores in order to initiate operation of the rotary magnet M192 of the Strowger mechanism 180, in the manner previously explained, whereby the selector S100 operates to select an idle trunk in the previously selected group, including the incoming trunk 310; which trunks extend to the group of trunk circuits, including the trunk circuit 300.

Assuming that the trunk 310 is the first idle trunk in the group previously selected by the selector S100, operation of the rotary magnet M192 is arrested incident to operation of the test relay R145 when the second wiper set of the Strowger mechanism 180 engages the contacts in the second section of the contact bank terminating the conductors of the trunk 310; the trunk 310 being marked as idle to the selector S100 by the application of battery potential upon the control conductor C314 thereof. More particularly, battery potential is connected by way of the lower winding of the answer relay R330 directly to the control conductor C314 of the trunk 310. Upon operating, the test relay R145 causes operation of the switch relay R150, as previously noted, thereby to interrupt, at the contacts 151 and 153, the original loop circuit extending between the calling subscriber substantion T12 and the line relay R110 in the selector S100; and to complete, at the contacts 152 and 154, an alternative loop circuit extending between the calling subscriber substation T12 and the line relay R340 in the trunk circuit 300. More specifically, ground potential is connected by way of the lower winding of the line relay R340, the contacts 324 and the winding 338 of the repeater 335 to the line conductor C312 of the trunk 310, and battery potential is connected by way of the upper winding of the line relay R340, the contacts 322 and the winding 336 of the repeater 335 to the line conductor C311 of the trunk 310; the line conductors C311 and C312 of the trunk 310 are connected by way of the line wipers 182*a*, 182*b* of the second wiper set of the Strowger mechanism 180, and the contacts 172, 174, 161, 163 and 152, 154 to the line conductors C101 and C102 of the trunk 100; and thence to the calling subscriber substation T12.

When this alternative loop circuit is thus completed the line relay R340 in the trunk circuit 300 operates to complete, at the contacts 341, an obvious circuit for operating the hold relay R345. Also, the line relay R340 completes, at the contacts 342, a bridge including the windings 337 and 339 of the repeater 335, and the upper winding of the answer relay R330 across the line conductors of the trunk line 395 extending to the switching apparatus 396 in the distant exchange 20, whereby the switching apparatus 396 is seized and conditioned to be responsive to digits transmitted thereto over the trunk line 395. Upon operating, the hold relay R345 completes, at the contacts 346, an obvious path for energizing the lower winding of the answer relay R330. However, the latter relay does not operate at this time as it is of the polarized type, and the upper winding thereof must be energized in the reverse direction over the trunk line 395 in order to effect operation thereof. Further, the hold relay R345 completes, at the contacts 346, an obvious path for applying ground potential to the control conductor C314 of the trunk 310, thereby to complete a holding circuit, including the control wiper 182*c* of the second wiper set of the Strowger mechanism 180, the contacts 178, 167 and 155, the conductor C104 and the contacts 156, for maintaining operated the switch relay R150 in the selector S100. The application of ground potential to the control conductor C314 of the trunk 310 completes a path, including the contacts 366 and the winding of the discriminating relay R360, for applying ground potential to the control conductor C319 of the trunk 315. The application of ground potential to the control conductor C314 of the trunk 310 and to the control conductor C319 of the trunk 315 marks the trunks 310 and 315 as busy to the selectors S100, etc. having access thereto. Also, this application of ground potential upon the control conductor C104 of the trunk 100 maintains the line switch 18 individual to the calling subscriber substation T12 in its operated position, and also completes an obvious multiple circuit, including the contacts 179, for maintaining operated the select relay R170 in the selector S100.

At this time the previously traced loop circuit is completed between the calling subscriber substation T12 and the line relay R340 in the trunk circuit 300, and the previously traced loop circuit is completed between the upper winding of the answer relay R330 in the trunk circuit 300 and the switching apparatus 396 in the distant exchange 20. The subscriber at the calling subscriber substation T12 then proceeds to dial the second digit of the directory number of the called subscriber substation T21 in the distant exchange 20, whereby the line relay R340 in the trunk circuit 300 follows, repeating at the contacts 342, the impulses of the second digit over the trunk line 395 to the switching apparatus 396 in the distant exchange 20. The hold relay R345 being of the slow-to-release type remains operated during impulsing by the line relay R340. The subscriber at the calling subscriber substation T12 in the central office 10 then dials the remainder of the digits of the directory number of the called subscriber substation T21 in the distant exchange 20, in order to bring about operation of the switching apparatus 396 to select the subscriber line 397 extending thereto, all in a conventional manner. The subsequent operation of the switching apparatus 396 depends upon the idle or busy condition of the called subscriber substation T21 at this time; and assuming that the called subscriber substation T21 is idle when the call is answered thereat, the switching apparatus 396 operates in order to complete a connection thereto and to effect the reversal of polarity over the trunk line 395. When the polarity of the trunk line 395 is thus reversed the upper winding of the answer relay R330 in the trunk circuit 300 is poled to operate; and upon operating, completes, at the contacts 331, an obvious circuit for operating the reverse battery relay R320. Upon operating, the reverse battery relay R320 reverses, at the contacts 321, 322, 323 and 324, the polarity of the loop circuit extending between the calling subscriber substation T12 in the central office 10 and the line relay R340 in the trunk circuit 300; which reversal of polarity over the loop circuit mentioned conditions the meter M12 connected to the line switch 18 to be operated, in a manner more fully explained hereinafter.

At this point it is noted that the timer mechanism 379 operates continuously to transmit intermittently on a timed basis ground impulses to the magnet M382 of the office timer 380, whereby the magnet M382 operates and restores intermittently. Each time the magnet M382 operates and restores it interrupts and then recompletes, at the contacts 383, an obvious path for applying ground potential to the wiper 381 of the office timer 380; and also drives the wiper 381 of the office timer 380 an additional step in the rotary direction. Accordingly, at any given time the wiper 381 of the office timer 380 may engage any contact in the associated contact bank, and it is thus necessary to synchronize the associated start pulse switch 390 in the trunk circuit 300 with the office timer 380 at this time. Continuing now with the operation of the trunk circuit 300, also upon operating, the reverse battery relay R320 completes, at the contacts 325, a circuit including the contacts 353 and 394 for operating the magnet M393 of the start pulse switch 390, thereby to cause the magnet M393 to operate and interrupt, at the contacts 394, the operating circuit therefor. The magnet M393 then restores to recomplete, at the contacts 394, the operating circuit therefor, whereby the magnet M393 operates buzzer fashion in order to drive the wipers 391 and 392 of the start pulse switch 390 step by step in the rotary direction until the wiper 391 of the start pulse switch 390 engages the contact in the associated contact bank terminating the conductor strapping the contact mentioned to the contact engaged by the wiper 381 of the office timer 380 at this time; whereupon there is completed a circuit for energizing the lower winding of the synchronizing relay R350. The synchronizing relay R350 then operates to interrupt, at the contacts 353, the previously traced circuit for operating the magnet M393 of the start pulse switch 390; and to complete, at the contacts 354, a series circuit, including the contacts 346 and 394, for energizing the upper winding of the synchronizing relay R350 in series with the magnet M393. When this series circuit is completed the synchronizing relay R350 is held in its operated position. However, the magnet M393 of the start pulse switch 390 is not operated due to the high series resistance of the upper winding of the synchronizing relay R350. The previously mentioned circuit for energizing the lower winding of the synchronizing relay R350 extends, when completed, from ground by way of the contacts 383, the wiper 381 and the engaged contact in the associated contact bank, the wiper 391 and the engaged contact in the associated contact bank, the contacts 326 and 356, and the lower winding of R350 to battery. At the conclusion of the predetermined unit time interval mentioned the magnet M382 of the office timer 380 again operates and restores, in order to drive the wiper 381 thereof an additional step in the rotary direction and into engagement with the contact in the associated contact bank that is strapped to the contact in the contact bank engaged by the wiper 392 of the start pulse switch 390, whereby ground potential is applied by way of the contact 383, the wiper 381 and the engaged contact in the associated contact bank, the strap mentioned, and the wiper 392 and the engaged contact in the associated contact bank, and the contacts 352 to the meter conductor C313 of the trunk 310. This application of ground potential to the meter conductor C313 of the trunk 310 completes a circuit, including the contacts 351, for energizing the upper winding of the timer relay R370, thereby to cause the latter relay to operate and complete, at the contacts 371, a holding circuit, including the contacts 346, for energizing the lower winding thereof. Also, this application of ground potential to the meter conductor C313 of the trunk 310 completes a path, including the meter wiper 182*m* of the second wiper set of the Strowger mechanism 180 and the contacts 176 and 165, for applying ground potential to the meter conductor C103 of the trunk 100; which application of ground potential to the meter conductor C103 of the trunk 100 effects operation of the meter M12 connected to the line switch 18 associated with the calling subscriber substation T12 in the central office 10.

At the conclusion of nine additional unit time intervals the magnet M382 has driven the wiper 381 of the office timer 380 again to engage the contact in the associated contact bank that is strapped to the contact in the contact bank engaged by the wiper 391 of the start pulse switch 390; which operation is without effect in the present example since the discriminating relay R360 in the trunk circuit 300 occupies its restored position. Subsequently, at the conclusion of an additional unit time interval, the magnet M382 drives the wiper 381 of the office timer 380 again to engage the contact in the associated contact bank that is strapped to the contact in the contact bank engaged by the wiper 392 of the start pulse switch 390, thereby again to apply ground potential to the meter conductor C313 in the trunk 310 and, consequently, to the meter conductor C103 in the trunk 100; whereby the meter M12 connected to the line switch 18 individually associated with the calling subscriber substation T12 is again operated. This sequence of operation continues, whereby at the conclusion of each ten unit time intervals the meter M12 connected to the line switch 18 individually associated with the calling subscriber substation T12 is reoperated. In view of the foregoing it will be appreciated that the calling subscriber substation T12 rendered non-restricted service in the central office 10 may extend a connection to a called subscriber substation in the distant exchange 20 and that the associated meter M12 is operated shortly following the answering of the call at the called subscriber substation in the distant exchange 20 and thereafter at the expiration of each ten unit time intervals.

At the conclusion of the connection, when the subscriber at the calling subscriber substation T12 in the central office 10 replaces the receiver of the telephone instrument thereat upon its associated switchhook, the previously traced loop circuit extending therefrom by way of the selector S100 to the line relay R340 in the trunk circuit 300 is interrupted in order to cause the latter relay to restore. Upon restoring, the line relay R340 interrupts, at the contacts 342, the previously traced loop circuit, including the trunk line 395 extending to the switching apparatus 396 in the distant exchange 20, thereby to cause the switching apparatus 396 to release, marking the subscriber line 397 extending to the called subscriber substation T21 in the distant exchange 20 as idle, assuming that the subscriber at the called subscriber substation T21 has replaced the receiver of the telephone instrument thereat upon its associated switchhook at this time. Also, when the line relay R340 interrupts, at the contacts 342, the loop circuit mentioned, the upper winding of the answer relay R330 is deenergized, causing the latter relay to restore. Further, the line relay R340 interrupts, at the contacts 341, the previously mentioned circuit for maintaining operated the hold relay R345 in order to cause the latter relay to restore shortly thereafter, it being of the slow-to-release type. Upon restoring, the answer relay R330 interrupts, at the contacts 331, the previously mentioned circuit for maintaining operated the reverse battery relay R320. Upon restoring, the hold relay R345 interrupts, at the contacts 346, the previously mentioned path for applying ground potential to the control conductor C314 of the trunk 310, thereby to interrupt the previously traced holding circuit for energizing the lower winding of the timer relay R370 and the previously traced multiple holding circuit for energizing the upper winding of the synchronizing relay R350 in series with the magnet M393 of the start pulse switch 390, whereby the timer relay R370 and the synchronizing relay R350 restore. Upon restoring, the reverse battery relay R320 restores, at the contacts 321, 322, 323 and 324, the polarity of the line conductors C311 and C312 of the trunk 310 with respect to the line relay R340. At this time the trunk circuit 300 is completely released. Also, when ground potential is removed from the control conductor C314 of the trunk 310, the previously traced holding circuit for maintaining operated the switch relay R150 in the selector S100 is interrupted, whereby the latter relay restores in order to bring about the release of the selector S100, in the manner previously explained. In this connection it is noted that the previously traced holding circuit for energizing the upper winding of the select relay R170 is arranged in multiple with the holding circuit for energizing the winding of the switch relay R150, whereby the select relay R170 restores incident to the restoration of the switch relay R150. At this time the selector S100 is completely released and available for further use. When the selector S100 is thus released the line switch 18 is restored, marking the subscriber line 17 extending to the subscriber substation T12 in the central office 10 as idle to the connectors in the group, including the connector 190, having access thereto.

Considering now the extension of a call from a subscriber substation rendered limited service, such, for example, as the subscriber substation T11 in the central office 10, to a called subscriber substation, such, for example, as the subscriber substation T21 in the distant exchange 20, the subscriber at the calling subscriber substation T11 first initiates the call in order to control the line switch 16 over the associated subscriber line 15, whereby the line switch 16 selects a trunk extending to an idle selector, such, for example, as the trunk 100 extending to the selector S100. The subscriber at the calling subscriber substation T11 then dials the first digit X of the directory number of the called subscriber substation T21 in the distant exchange 20. It will, of course, be understood that the subscriber at the calling subscriber substation T11 merely operates the dial thereat utilizing the eleventh digit finger hole therein, whereby the dial mentioned causes eleven impulses in a group to be transmitted therefrom over the subscriber line 15, the line switch 16 and the trunk 100 to the selector S100. The selector S100 responds to the digit X in a manner substantially identical to that previously explained. However, since the Strowger mechanism 180 is capable of only ten steps in the vertical direction, the eleventh impulse transmitted to the vertical magnet M191 thereof is without effect and, in fact, the wiper carriage of the Strowger mechanism 180 is driven ten steps in the vertical direction away from its home position. However, the magnet M197 of the discriminator switch 195 is capable of responding to the eleventh impulse of the digit X, in order to cause the wiper 196 thereof to engage the eleventh contact in the associated contact bank terminating the conductor extending to the lower winding of the selector relay R160. Accordingly, in the present example, at the conclusion of the first digit X, when the transfer relay R130 restores, it completes, at the contacts 135, a circuit in multiple to the winding of the hold relay R120 and including the contacts 158 and 112 for applying ground potential to the wiper 196 of the discriminator switch 195. This application of ground potential to the wiper 196 of the discriminator switch 195 completes an obvious circuit for energizing the lower winding of the select relay R160, thereby to cause the latter relay to operate and complete, at the contacts 169, a holding circuit, including the contacts 122, for energizing the upper winding thereof. Also, the switch relay R160 interrupts, at the contacts 161, 163 and 167, the previously traced connections between the selector S100 and the wipers 181*a*, 181*b* and 181*c* of the first wiper set of the Strowger mechanism 180; and completes, at the contacts 162, 164, 166 and 168, connections between the selector S100 and the wipers 183*a*, 183*b*, 183*m* and 183*c* of the third wiper set of the Strowger mechanism 180. Shortly following the restoration of the transfer relay R130, the transfer relay R140 restores in order to initiate operation of the rotary magnet M192 of the Strowger mechanism 180, in the manner previously explained, whereby the selector S100 operates to select an idle trunk in the previously selected group, including the incoming trunk 315; which trunks extend to the group of trunk circuits, including the trunk circuit 300.

Assuming that the trunk 315 is the first idle trunk in the group previously selected by the selector S100, operation of the rotary magnet M192 is arrested incident to operation of the test relay R145 when the third wiper set of the Strowger mechanism 180 engages the contacts in the third section of the contact bank terminating the conductors of the trunk 315; the trunk 315 being marked as idle to the selector S100 by the application of battery potential upon the control conductor C319 thereof. More particularly, battery potential is connected by way of the lower winding of the answer relay R330, the contacts 366 and the winding of the discriminating relay R360 to the control conductor C319; whereby the discriminating relay R360 in the trunk circuit 300 operates in series with the test relay R145 in the selector S100.

Upon operating, the test relay R145 causes operation of the switch relay R150, as previously noted, thereby to interrupt, at the contacts 151 and 153, the original loop circuit extending between the calling subscriber substation T11 and the line relay R110 in the selector S100; and to complete, at the contacts 152 and 154, an alternative loop circuit extending between the calling subscriber substation T11 and the line relay R340 in the trunk circuit 300. More specifically, ground potential is connected by way of the lower winding of the line relay R340, the contacts 324 and the winding 338 of the repeater 335 to the line conductor C317 of the trunk 315, and battery potential is connected by way of the upper winding of the line relay R340, the contacts 322 and the winding 336 of the repeater 335 to the line conductor C316 of the trunk 315; the line conductors C316 and C317 of the trunk 315 are connected by way of the line wipers 183*a*, 183*b* of the third wiper set of the Strowger mechanism 180, and the contacts 162, 164 and 152, 154 to the line conductors C101 and C102 of the trunk 100; and thence to the calling subscriber substation T11.

When this alternative loop circuit is thus completed the line relay R340 in the trunk circuit 300 operates to complete, at the contacts 341, an obvious circuit for operating the hold relay R345. Also, the line relay R340 completes, at the contacts 342, a bridge including the windings 337 and 339 of the repeater 335, and the upper winding of the answer relay R330 across the line conductors of the trunk line 395 extending to the switching apparatus 396 in the distant exchange 20, whereby the switching apparatus 396 is seized and conditioned to be responsive to digits transmitted thereto over the trunk line 395. Upon operating, the hold relay R345 completes, at the contacts 346, an obvious path for energizing the lower winding of the answer relay R330. However, the latter relay does not operate at this time as it is of the polarized type, and the upper winding thereof must be energized in the reverse direction over the trunk line 395 in order to effect operation thereof. Further, the hold relay R345 completes, at the contacts 346, an obvious path for applying ground potential to the control conductor C314 of the trunk 310, thereby to complete a holding circuit, including the contacts 366, the winding of the discriminating relay R360, the control conductor C319 of the trunk 315, the third control wiper 183*c* of the third wiper set of the Strowger mechanism 180, the contacts 168 and 155, the conductor C104, and the contacts 156, for maintaining operated the discriminating relay R360 in the trunk circuit 300 and the switch relay R150 in the selector S100. The application of ground potential to the control conductor C314 of the trunk 310 and to the control conductor C319 of the trunk 315 mark the trunks 310 and 315 as busy to the selectors S100, etc. having access thereto. Also, this application of ground potential upon the control conductor C104 of the trunk 100 maintains the line switch 16 individual to the calling subscriber substation T11 in its operated position and completes an obvious multiple circuit, including the contacts 169, for maintaining operated the select relay R160 in the selector S100.

At this time the previously traced loop circuit is completed between the calling subscriber substation T11 and the line relay R340 in the trunk circuit 300, and the previously traced loop circuit is completed between the upper winding of the answer relay R330 in the trunk circuit 300 and the switching apparatus 396 in the distant exchange 20. The subscriber at the calling subscriber substation T11 then proceeds to dial the second digit of the directory number of the called subscriber substation T21 in the distant exchange 20, whereby the line relay R340 in the trunk circuit 300 follows, repeating at the contacts 342, the impulses of the second digit over the trunk line 395 to the switching apparatus 396 in the distant exchange 20. The hold relay R345 being of the slow-to-release type remains operated during impulsing by the line relay R340. The subscriber at the calling subscriber substation T11 in the central office 10 then dials the remainder of the digits of the directory number of the called subscriber substation T21 in the distant exchange 20, in order to bring about operation of the switching apparatus 396 to select the subscriber line 397 extending thereto, all in a conventional manner. The subsequent operation of the switching apparatus 396 depends upon the idle or busy condition of the called subscriber substation T21 at this time; and assuming that the called subscriber substation T21 is idle when the call is answered thereat, the switching apparatus 396 operates in order to complete a connection thereto and to effect the reversal of polarity over the trunk line 395. When the polarity of the trunk line 395 is thus reversed the upper winding of the answer relay R330 in the trunk circuit 300 is poled to operate; and upon operating, completes, at the contacts 331, an obvious circuit for operating the reverse battery relay R320. Upon operating, the reverse battery relay R320 reverses, at the contacts 321, 322, 323 and 324, the polarity of the loop circuit extending between the calling subscriber substation T11 in the central office 10 and the line relay R340 in the trunk circuit 300; which reversal of polarity over the loop circuit mentioned conditions the meter M11 connected to the line switch 16 to be operated, in a manner more fully explained hereinafter.

Also, upon operating, the reverse battery relay R320 completes, at the contacts 325, the previously traced circuit for operating the magnet M393 of the start pulse switch 390 in order to cause intermittent operation thereof, in the manner previously explained, whereby the wipers 391 and 392 of the start pulse switch 390 are driven step by step in the rotary direction until the wiper 391 thereof engages the contact in the associated contact bank terminating the conductor strapping the contact mentioned to the contact engaged by the wiper 381 of the office timer 380 at this time, thereby to bring about operation of the synchronizing relay R350 and the consequent arresting of further operation of the magnet M393 of the start pulse switch 390, all in the manner previously explained. At this time the synchronizing relay R350 is held in its operated position by way of the previously traced holding circuit for energizing the upper winding thereof; and at the conclusion of the predetermined unit time interval mentioned the magnet M382 of the office timer 380 again operates and restores, in order to drive the wiper 381 thereof an additional step in the rotary direction and into engagement with the contact in the associated contact bank that is strapped to the contact in the contact bank engaged by the wiper 392 of the start pulse switch 390, whereby ground potential is applied by way of the contact 383, the wiper 381 and the engaged contact in the associated contact bank, the strap mentioned, and the wiper 392 and the engaged contact in the associated contact bank, and the contacts 352 to the meter conductor C318 of the trunk 315. This application of ground potential to the meter conductor C318 of the trunk 315 completes a circuit, including the contacts 351, for energizing the upper winding of the timer relay R370, thereby to cause the latter relay to operate and complete, at the contacts 371, a holding circuit, including the contacts 346, for energizing the lower winding thereof. Also, this application of ground potential to the meter conductor C318 of the trunk 315 completes a path, including the meter wiper 183*m* of the third wiper set of the Strowger mechanism 180 and the contacts 166, for applying ground potential to the meter conductor C103 of the trunk 100; which application of ground potential to the meter conductor C103 of the trunk 100 effects operation of the meter M11 connected to the line switch 16 associated with the calling subscriber substation T11 in the central office 10.

At the conclusion of nine additional unit time intervals the magnet M382 has driven the wiper 381 of the office timer 380 again to engage the contact in the associated contact bank that is strapped to the contact in the contact bank engaged by the wiper 391 of the start pulse switch 390, thereby to complete a path, including the contacts 383, for applying ground potential to the wiper 391. This application of ground potential to the wiper 391 of the start pulse switch 390 completes a circuit, including the contacts 326, 355, 361, 372 and 378, for energizing the lower winding of the timer relay R375, whereby the latter relay operates through its first step to complete, at the contacts 376, a substantially identical path, including the contacts 346, for short-circuiting the upper winding thereof, the timer relay R375 being of the two-step type. Subsequently, at the conclusion of an additional unit time interval, the magnet M382 drives the wiper 381 of the office timer 380 again to engage the contact in the associated contact bank that is strapped to the contact in the contact bank engaged by the wiper 392 of the start pulse switch 390, thereby again to apply ground potential to the meter conductor C318 of the trunk 315 and, consequently, to the meter conductor C103 of the trunk 100, whereby the meter M11 connected to the line switch 16 individually associated with the calling subscriber substation T11 is again operated. Also, at this time, when the wiper 381 of the office timer 380 disengages the contact in the associated contact bank that is strapped to the contact in the contact bank engaged by the wiper 391 of the start pulse switch 390, the previously traced path for short-circuiting the upper winding of the timer relay R375 is interrupted, whereby the upper and lower windings of the timer relay R375 are energized in series over a circuit including the contacts 376 and 346. When the timer relay R375 is thus energized it operates through its second step.

At the conclusion of nine additional unit time intervals the magnet M382 has driven the wiper 381 of the office timer 380 again to engage the contact in the associated contact bank that is strapped to the contact in the contact bank engaged by the wiper 391 of the start pulse switch 390, thereby to complete a circuit, including the contacts 383, the wipers 381 and 391 mentioned, the contacts 326, 355, 361, 372 and 377, for operating the time release relay R365. Upon operating, the time release relay R365 completes, at the contacts 367, a holding circuit for maintaining it operated, including the contacts 346; and interrupts, at the contacts 366, the previously traced holding circuit for maintaining operated the discriminating relay R360 in the trunk circuit 300 and the switch relay R150 in the selector S100. The switch relay R150 in the selector S100 then restores in order to effect the release of the selector S100 and the trunk circuit 300, and the consequent release of the established connection between the calling subscriber substation T11 in the central office 10 and the called subscriber substation T21 in the distant exchange 20, all in the manner previously explained. In view of the foregoing it will be appreciated that the calling subscriber substation T11 rendered limited service in the central office 10 may extend a connection to a called subscriber substation in the distant exchange 20, and that the associated meter M11 is operated shortly following the answering of the call at the called subscriber substation in the distant exchange 20 and again at the expiration of ten unit time intervals. However, in the event that the established connection between the calling subscriber substation T11 in the central office 10 and the called subscriber substation in the distant exchange 20 persists for an additional nine unit time interval, the connection is automatically released by virtue of the operation of the time release relay R365 in the trunk circuit 300 as explained above.

Of course, it will be understood that the normal release of the established connection takes place when the subscriber at the calling subscriber substation T11 in the central office 10 replaces the receiver of the telephone instrument thereat upon its associated switchhook, interrupting the previously traced loop circuit extending therefrom by way of the selector S100 to the line relay R340 in the trunk circuit 300, whereby the latter relay restores. Upon restoring, the line relay R340 effects the release of the switching apparatus 396 in the distant exchange 20, the trunk circuit 300 and the selector S100, all in the manner previously explained. In this connection it is noted that when the hold relay R345 in the trunk circuit 300 resores to interrupt, at the contacts 346, the previously mentioned path for applying ground potential to the control conductor C314 of the trunk 310, the previously traced holding circuits for maintaining operated the timer relay R375 and the time release relay R365 in the trunk circuit 300 are interrupted causing these relays to restore. Also, in this connection it is noted that the previously traced holding circuit for energizing the upper winding of the select relay R160 is arranged in multiple with the holding circuit for energizing the winding of the switch relay R150 in the selector S100, whereby the select relay R160 restores incident to the restoration of the switch relay R150. When the selector S100 is thus released the line switch 16 is restored, marking the subscriber line 15 extending to the subscriber substation T11 in the central office 10 as idle to the connectors in the group, including the connector 190, having access thereto.

*Trunk calls from the central office 10 to the remote exchange 30 and calls to the operator switchboard 280 in the central office 10*

At the outset it is noted that the subscriber substations rendered restricted service, such, for example, as the subscriber substation T10 in the central office 10, are not permitted to extend connections to the remote exchange 30 and, specifically, that such stations do not have facility for controlling operation of the hunt switches in the secondary trunks 200, etc. in order to bring about this result, as explained more fully hereinafter in conjunction with the extension of connections from subscriber substations rendered non-restricted service and subscriber substations rendered limited service in the central office 10. Specifically, a subscriber substation rendered restricted service, such, for example, as the subscriber substation T10 in the central office 10, must first extend a connection to the operator switchboard 280 in the central office 10, in a manner more fully explained hereinafter, and permit the operator at the switchboard 280 to complete the connection to a called subscriber substation in the remote exchange 30.

Considering now the extension of a call from a subscriber substation rendered non-restricted service, such, for example, as the subscriber substation T12 in the central office 10 to a called subscriber substation, such, for example, as the called subscriber substation T31 in the remote exchange 30, the subscriber at the calling subscriber substation T12 first initiates the call in order to control the line switch 18 over the associated subscriber line 17, whereby the line switch 18 selects a trunk extending to an idle selector, such, for example, as the trunk 100 extending to the selector S100. The subscriber at the calling subscriber substation T12 then dials the first digit 9 of the directory number of the called subscriber substation T31 in the remote exchange 30. The selector S100 responds to the digit 9 in a manner substantially identical to that previously explained, whereby the Strowger mechanism 180 first selects the group of trunks, including the trunk 210, and then an idle trunk therein. Assuming that the selector S100 selects the trunk 210 extending to the secondary trunk 200, the trunk 210 is marked as idle to the selector S100 by the application of battery potential to the control conductor C213 thereof. The path for applying battery potential to the control conductor C213 of the trunk 210 includes the rotary magnet M276 of the hunt switch 270 incorporated in the secondary trunk 200, the contacts 277, the wiper 274 and the engaged home contact in the associated contact bank, and the upper winding of the transfer relay R240. When the selector S100 has operated, in the manner previously explained, to select the trunk 210, ground potential is applied in the selector S100 to the control conductor C213 of the trunk 210, thereby to complete a circuit substantially identical to that traced above for energizing the upper winding of the transfer relay R240 in series with the rotary magnet M276 in the secondary trunk 200, whereby the transfer relay R240 operates. However, the rotary magnet M276 does not operate due to the high series resistance of the upper winding of the transfer relay R240. Also, when the selector S100 operated to select the trunk 210, in the manner previously explained, a loop circuit is completed between the calling subscriber substation T12 and the line relay R220 in the secondary trunk 200, which loop circuit extends from ground by way of the lower winding of the line relay R220 and the contacts 253 to the line conductor C212 of the trunk 210, and from battery by way of the upper winding of the line relay R220 and the contacts 251 to the line conductor C211 of the trunk 210; the line conductors C211 and C212 of the trunk 210 being terminated by contacts in the first section of the contact bank engaged by the line wipers 181*a* and 181*b* of the first wiper set of the Strowger mechanism 180 in the selector S100. Accordingly, the line relay R220 in the secondary trunk 200 operates to complete, at the contacts 221, a path, including the contacts 258, for operating the hold relay R230. Upon operating, the hold relay R230 completes, at the contacts 231, a multiple circuit for applying ground potential to the control conductor C213 of the trunk 210, thereby to maintain operated the transfer relay R240 in the secondary trunk 200 and the switch relay R150 in the selector 100. At this time the secondary trunk 200 is conditioned to respond to the next digit dialed at the calling subscriber substation T12. The subscriber at the calling subscriber substation T12 then dials the second digit Y of the directory number of the called subscriber substation T31 in the remote exchange 30. It will, of course, be understood that the subscriber at the calling subscriber substation T12 merely operates the dial thereat, utilizing the eleventh digit finger hole therein, whereby the dial mentioned causes twelve impulses in a group to be transmitted therefrom over the subscriber line 17, the line switch 18, the trunk 100, the selector S100, and the trunk 210 to the line relay R220 in the secondary trunk 200, whereby the latter relay follows.

Each time the line relay R220 restores and then reoperates it interrupts and then recompletes, at the contacts 221, the previously traced circuit for maintaining operated the hold relay R230, whereby the latter relay being of the slow-to-release type is maintained operated during impulsing. Also, each time the line relay R220 restores and then reoperates it completes and then interrupts, at the contacts 222, a circuit, including the contacts 258, 233 and 243, for energizing the lower winding of the transfer relay R240, thereby to maintain the latter relay in its operated position during the reception of the present digit and after the wiper 274 of the hunt switch 270 disengages the home contact in the associated contact bank, interrupting the previously traced circuit for energizing the upper winding of the transfer relay R240 in series with the rotary magnet M276. Further, each time the line relay R220 restores and then reoperates it completes and then interrupts, at the contacts 222, a multiple circuit, including the contacts 258, 233, 243 and 244, for operating the rotary magnet M276 of the hunt switch 270. Accordingly, in the present example, the line relay R220 receives the twelve impulses of the second digit Y, repeating them, at the contacts 222, to the rotary magnet M276, whereby the wipers noted of the hunt switch 270 are driven twelve steps in the clockwise direction away from their home positions. When the wipers 271, 272 and 273 of the hunt switch 270 are thus operated, they are driven across the group of nine trunks, including the trunk 281, extending to the operator switchboard 280 and into the group of fourteen trunk lines, including the trunk line 286, extending between the central office 10 and the remote exchange 30. At the conclusion of the second digit Y the line relay R220 is maintained in its operated position, thereby to interrupt, at the contacts 222, the above-traced circuit for energizing the lower winding of the hold relay R240; and when the wiper 274 of the hunt switch 270 is driven one step in the clockwise direction away from its home position to disengage the home contact in the associated contact bank, it interrupts the previously traced circuit for energizing the upper winding of the transfer relay R240 in series with the rotary magnet M276; accordingly the transfer relay R240 restores shortly following the conclusion of the second digit Y.

Upon restoring, the transfer relay R240 completes, at the contacts 242 and 241, a path, including the contacts 232 and 255, for applying ground potential by way of the winding of the test relay R250 to the wiper 273 of the hunt switch 270, in order to test the idle or busy condition of the trunk line, extending between the central office 10 and the remote exchange 30, that is selected by the wipers 271, 272 and 273 of the hunt switch 270 at this time. In the event the trunk line selected by the wipers 271, 272 and 273 of the hunt switch 270 is busy at this time, ground potential is applied to the control conductor thereof in the associated trunk circuit, thereby to complete a path, substantially identical to that previously traced and including the wiper 273 of the hunt switch 270, for short-circuiting the winding of the test relay R250. On the other hand, in the event the trunk line mentioned is idle at this time, battery potential applied to the control conductor thereof in the associated trunk circuit, and, consequently, to the wiper 273 of the hunt switch 270, completes a circuit substantially identical to that previously traced for energizing the winding of the test relay R250 in order to cause the latter relay to operate. First assuming that the trunk mentioned is busy at this time, the ground potential upon the control conductor thereof and applies to the wiper 273 of the hunt switch 270 completes a circuit, including the contacts 241, 255 and 277, for operating the rotary magnet M276 of the hunt switch 270, whereby the rotary magnet M276 operates to drive the wipers noted of the hunt switch 270 an additional step in the clockwise direction and to interrupt, at the contacts 277, the operating circuit therefor. Accordingly, the rotary magnet M276 operates buzzer fashion to drive the wipers noted of the hunt switch 270 step by step in the clockwise direction until an idle trunk extending between the central office 10 and the remote exchange 30 is selected by the wipers 271, 272 and 273 thereof, whereupon the test relay R250 operates, as previously explained. Now assuming that the trunk line 286, extending between the central office 10 and the remote exchange 30, is the first idle trunk line in the associated group, when the wipers 271, 272 and 273 engage the contacts in the associated contact bank terminating the trunk line 286, the test relay R250 operates, as noted above, to complete, at the contacts 257, a holding circuit, including the contacts 231 and 277, for energizing the winding of the test relay R250 in series with the rotary magnet M276, whereby the test relay R250 is retained in its operated position but the rotary magnet M276 is not reoperated, by virtue of the high series resistance of the winding of the test relay R250. Also, the test relay R250 interrupts, at the contacts 255, the previously traced original operating circuit therefor; and completes, at the contacts 256, a path, including the contacts 231, for applying ground potential to the wiper 273 of the hunt switch 270 and, consequently, to the control conductor of the trunk line 286; whereby the trunk circuit 287 associated with the trunk line 286 operates in order to return ground potential upon the control conductor of the trunk line 286, whereupon the test relay R250 is maintained in its operated position by virtue of the completed holding circuit for energizing the winding thereof in series with the rotary magnet M276. Also, the test relay R250 interrupts, at the contacts 251 and 253, the previously traced original loop circuit, extending between the calling subscriber substation T12 in the central office 10 and the line relay R220 in the secondary trunk 200; and completes, at the contacts 252 and 254, an alternative loop circuit, extending between the calling subscriber substation T12 in the central office 10 and the trunk circuit 287 terminating the trunk line 286 extending between the central office 10 and the remote exchange 30. The loop circuit mentioned includes the line wipers 271 and 272 of the hunt switch 270 and the engaged contacts in the associated contact banks. The trunk circuit 287 then operates in order to effect seizure of the switching apparatus 285 in the remote exchange 30 over the trunk line 286. Further, the test relay R250 interrupts, at the contacts 258, the previously traced circuit for maintaining operated the hold relay R230, thereby to cause the latter relay to restore shortly thereafter, it being of the slow-to-release type. Upon restoring, the hold relay R230 interrupts, at the contacts 231, the original path for applying ground potential to the control conductor C213 of the trunk 210. However, ground potential is applied to the control conductor C213 of the trunk 210 from the trunk circuit 287 terminating the trunk line 286 at this time, by virtue of the connection of the control conductor C213 by way of the contacts 256 and the wiper 273 of the hunt switch 270 and the engaged contact in the associated contact bank to the control conductor of the trunk line 286. Accordingly, the test relay R250 in the secondary trunk 200 as well as the switch relay R150 in the selector S100 are maintained in their operated positions, in order to maintain operated the secondary trunk 200 and the selector S100 respectively.

At this time the above-traced loop circuit is completed between the calling subscriber substation T12 in the central office 10 and the trunk circuit 287, and the trunk circuit 287 has brought about seizure of the switching apparatus 285 in the remote exchange 30 over the trunk line 286, whereby the switching apparatus 285 is conditioned to respond to the third and remaining digits of the directory number of the called subscriber substation T31 in the remote exchange 30. The subscriber at the calling subscriber substation T12 in the central office 10 then proceeds to dial the remaining digits of the directory number of the called subscriber substation T31 in the remote exchange 30, which digits are transmitted over the loop circuit extending from the calling subscriber substation T12 to the trunk circuit 287 and are repeated by the trunk circuit 287 over the trunk line 286 to the switching apparatus 285, in order to cause the switching apparatus 285 to operate and select the subscriber line 288 extending to the called subscriber substation T31 in the remote exchange 30. The subsequent operation of the switching apparatus 285 depends upon the idle or busy condition of the called subscriber substation T31 at this time; and assuming that the called subscriber substation T31 is idle, when the call is answered thereat, the switching apparatus 285 operates in order to complete a connection thereto, whereby a connection is established between the calling subscriber substation T12 in the central office 10 and the called subscriber substation T31 in the remote exchange 30.

At the conclusion of the connection when the subscriber at the calling subscriber substation T12 in the central office 10 replaces the receiver of the telephone instrument thereat upon its associated switchhook, the previously traced loop circuit extending therefrom by way of the selector S100 and the secondary trunk 200 to the trunk circuit 287 is interrupted, in order to cause the trunk circuit 287 to effect the release of the switching apparatus 285, whereby the subscriber line 288 extending to the called subscriber substation T31 in the remote exchange 30 is marked as idle, assuming that the subscriber at the called subscriber substation T31 has replaced the receiver of the telephone instrument thereat upon its associated switchhook at this time. Also, the trunk circuit 287 operates to interrupt the application of ground potential upon the control conductor of the trunk line 286 and to re-apply battery potential thereto, in order to mark the trunk line 286 as idle to the hunt switches in the secondary trunks 200, etc. Also, when ground potential is removed from the control conductor of the trunk line 286, the previously traced holding circuit for maintaining operated the test relay R250 in the secondary trunk 200 and the multiple holding circuit for maintaining operated the switch relay R150 in the selector S100 are interrupted. The switch relay R150 restores, effecting the release of the selector S100 in the manner previously explained, whereby the line switch 18 is restored, marking the subscriber line 17 extending to the subscriber substation T12 in the central office 10 as idle to the connectors in the group, including the connector 190, having access thereto.

Upon restoring, the test relay R250 in the secondary trunk 200 completes, at the contacts 259, a path, including the contacts 234, for applying ground potential to the multiple connected contacts in the contact bank associated with the wiper 274 of the hunt switch 270, thereby to complete a circuit, including the contacts 277, for operating the rotary magnet M276. The rotary magnet M276 operates intermittently in order to drive the wipers noted of the hunt switch 270 step by step in the clockwise direction back into their home positions, whereupon the wiper 274 disengages the last multiple grounded contact in the associated contact bank in order to interrupt the above-traced circuit for operating intermittently the rotary magnet M276. When the wiper 274 of the hunt switch 270 re-engages the home contact in the associated contact bank, the previously traced path for applying battery potential by way of the rotary magnet M276 and the upper winding of the transfer relay R240 to the control conductor C213 of the trunk 210 is recompleted, thereby again to mark the trunk 210 and, consequently, the secondary trunk 200, as idle to the selectors S100, etc. having access thereto. At this time the secondary trunk 200 is completely released and available for further use.

Reconsidering the operation of the hunt switch 270 incorporated in the secondary trunk 200, following the conclusion of the second digit Y dialed at the calling subscriber substation T12, it is noted that the rotary magnet M276 cooperates with the test relay R250 in order to test the trunk lines in the group of fourteen extending between the central office 10 and the remote exchange 30, and including the trunk line 286, in the manner previously explained. However, should it occur that all of the trunk lines extending between the central office 10 and the remote exchange 30 are busy at this time, the wipers 271, 272 and 273 disengage the last contacts in the associated contact bank terminating the last trunk line in the group of fourteen mentioned, and re-engage the home contacts in the associated contact bank. When the wiper 274 of the hunt switch 270 re-engages the home contact in the associated contact bank, the previously traced circuit for energizing the upper winding of the transfer relay R240 in series with the rotary magnet M276 is recompleted, thereby to cause the transfer relay R240 to reoperate and interrupt, at the contacts 241 and 242, the previously traced path, including the winding of the test relay R250, for testing over the wiper 273 of the hunt switch 270 the trunk lines in the group, including the trunk line 286, extending between the central office 10 and the remote exchange 30. Accordingly, in this peculiar event the secondary trunk 200 responded to the second digit Y dialed at the calling subscriber substation T12 in the central office 10, tested the trunk lines extending between the central office 10 and the remote exchange 30, and, finding them busy, returned to its original condition, whereby the secondary trunk 200 failed to switch through and is thus in condition to receive the third digit dialed at the calling subscriber substation T12. Hence, when the subscriber at the calling subscriber substation T12 in the central office 10 dials the third digit of the directory number of the called subscriber substation T31 in the remote exchange 30, the third digit mentioned is transmitted to the line relay R220 in the secondary trunk 200 instead of to the trunk circuit 287, etc. in the usual case. Thus, the line relay R220 responds to the third digit of the directory number of the called subscriber substation T31 in the remote exchange 30, which third digit comprises some digit between 1 and 0 and brings about corresponding operation of the hunt switch 270. Accordingly, at the conclusion of the third digit mentioned, when the transfer relay R240 restores, the hunt switch 270 occupies an operated position whereby the wipers 271, 272 and 273 thereof are disposed in the group of nine trunks, including the trunk 281, extending to the operator switchboard 280 or engaging the tenth contacts in the associated contact bank terminating no conductors in the special event that the third digit of the directory number of the called subscriber substation T31 in the remote exchange 30 happened to be 0.

First assuming that the third digit of the directory number of the called subscriber substation T31 in the remote exchange 30 was some digit smaller than 0, such, for example, as the digit 5, the wipers 271, 272 and 273 of the hunt switch 270 engage the fifth contacts in the associated contact banks at the conclusion of the third digit mentioned and when the transfer relay R240 restores, whereby the fifth trunk extending to the operator switchboard 280 is tested by the secondary trunk 200. At this time the rotary magnet M276 cooperates with the test relay R250, in the manner previously explained, in order to cause the fifth and following trunks in the group extending to the operator switchboard 280 to be tested, in the manner previously explained. In the event one of the trunks mentioned is idle, the hunt switch 270 selects this idle trunk, thereby extending the connection thereover to the operator switchboard 280 incident to operation of the test relay R250. However, in the event the fifth and following trunks extending to the operator switchboard 280 are busy, the wipers noted of the hunt switch 270 are driven to engage the tenth contacts in the associated contact banks. The tenth contacts in the contact banks associated with the wipers 271, 272 and 273 of the hunt switch 270 engage no conductors. However, the wiper 275 of the hunt switch 270 engages the grounded tenth contact in the associated contact bank, thereby completing a circuit, including the contacts 263 and 245, for energizing the upper winding of the lockout relay R260 in series with the rotary magnet M276. When this series circuit is completed, the lockout relay R260 operates. However, the rotary magnet M276 does not operate due to the high series resistance of the upper winding of the lockout relay R260. Upon operating, the lockout relay R260 completes, at the contacts 262, an obvious holding circuit for energizing the upper and lower windings thereof in series; and interrupts, at the contacts 263, the previously traced original circuit for energizing the upper winding thereof in series with the rotary magnet M276. Also, the lockout relay R260 completes, at the contacts 264, a path for grounding the eleventh to twenty-fourth and home contacts in the contact bank associated with the wiper 275 of the hunt switch 270. Finally, the lockout relay R260 completes, at the contacts 261, a direct circuit, including the contacts 277, for operating the rotary magnet M276. The rotary magnet M276 operates intermittently to drive the wipers noted of the hunt switch 270 from engagement with the tenth contacts in the associated contact banks through the twenty-fourth and then home positions, and into engagement with the first contacts in the associated contact banks terminating the first trunk in the group extending to the operator switchboard 280. When the hunt switch 270 is driven through its home position the wiper 275 thereof disengages the grounded home contact in the associated contact bank, interrupting the previously traced holding circuit for maintaining operated the lockout relay R260, whereby the latter relay restores, interrupting, at the contacts 261, the direct circuit for operating intermittently the rotary magnet M276. Accordingly, at this time the first and following trunks extending to the operator switchboard 280 are tested by the secondary trunk 200. It will be understood that the arrangement including the lockout relay R260 positively prevents the hunt switch 270 from testing the second time any of the trunk lines extending between the central office 10 and the remote exchange 30.

The hunt switch 270 operates, in the manner explained above, repeatedly to test the trunks in the group extending to the operator switchboard 280 and until an idle trunk extending thereto is found. Assuming that the trunk 281, extending to the operator switchboard 280, is idle at this time, the hunt switch 270 operates to select the trunk 281 and to bring about operation of the test relay R250, thereby to complete a connection between the calling subscriber substation T12 in the central office 10 and the operator switchboard 280. At this time the trunk circuit 282 associated with the trunk 281 operates to mark the trunk 281 as busy to the hunt switches of the other secondary trunks having access thereto. The operator at the switchboard 280 then answers the call, completing a connection to the calling subscriber substation T12 in the central office 10, advising the subscriber thereat that the present call was intercepted by virtue of the all-busy condition of the trunk lines extending between the central office 10 and the remote exchange 30. The release of the established connection between the calling subscriber substation T12 and the operator switchboard 280 is the same as the previously described connection and is brought about in response to the release operation performed at the calling subscriber substation T12, whereby the loop circuit extending to the trunk circuit 282 is interrupted, causing the trunk circuit 282 to operate, interrupting the application of ground potential to the control conductor of the trunk 281 and returning battery potential thereto, whereby the trunk 281 is marked as idle to the hunt switches of the secondary trunks having access thereto, assuming that the operator at the switchboard 280 has disconnected from the trunk 281 at this time. The release of the secondary trunk 200 and the selector S100 then takes place, in the manner previously explained.

In the foregoing explanation it was assumed that the third digit of the directory number of the called subscriber substation T31 was other than 0 and was, in fact, 5. However, in the event the third digit of the directory number of the called subscriber substation T31 in the remote exchange 30 had been 0, the operation of the secondary trunk 200 would have been substantially the same as that described above except that the lockout relay R260 would have operated immediately following the restoration of the transfer relay R240 at the conclusion of the third digit mentioned. At this point it is noted that the operation of the secondary trunk 200 as described above, when all of the trunks extending between the central office 10 and the remote exchange 30 are tested as busy, and when the third digit of the directory number of the called subscriber substation T31 in the remote exchange 30 is 0, is precisely the same as that of the secondary trunk 200 when the second digit dialed at the calling subscriber substation T12 is 0, which second digit 0 in conjunction with the first digit 9 comprises the directory number of the operator switchboard 280.

In view of the above it will be appreciated that when a call is initiated at the calling subscriber substation T12 rendered non-restricted service in the central office 10, that is to be extended to the operator switch 280 therein, the subscriber at the calling subscriber substation T12 dials the two digits 9 and 0 in order to bring about operation first of the selector S100, etc. and then of the secondary trunk 200, etc. in the manner explained immediately above, in order to route the call to the operator switchboard 280. In this connection it will be appreciated that the lockout relay R260 in the secondary trunk 200, for example, operates immediately following the second digit 0 when the transfer relay R240 restores, in order to initiate operation of the hunt switch 270 to search for an idle trunk extending to the operator switchboard 280, in the manner explained above. The release of this established connection between the calling subscriber substation T12 and the operator switchboard 280 in the central office 10 is the same as that previously described.

Considering now the extension of a call from a subscriber substation rendered limited service, such, for example, as the subscriber substation T11 in the central office 10 to a called subscriber substation, such, for example, as the called subscriber substation T31 in the remote exchange 30, the subscriber at the calling subscriber substation T11 first initiates the call in order to control the line switch 16 over the associated subscriber line 15, whereby the line switch 16 selects a trunk extending to an idle selector, such, for example, as the trunk 100 extending to the selector S100. The subscriber at the calling subscriber substation T11 then dials the first digit 9 of the directory number of the called subscriber substation T31 in the remote exchange 30. The selector S100 responds to the digit 9 in the manner previously explained, whereby the Strowger mechanism 180 first selects the group of trunks, including the trunk 210, and then an idle trunk therein. Assuming that the selector S100 selects the trunk 210 extending to the secondary trunk 200, the trunk 210 is marked as idle to the selector S100 by the application of battery potential to the control conductor C213 thereof. The path for applying battery potential to the control conductor C213 of the trunk 210 includes the rotary magnet M276 of the hunt switch 270 incorporated in the secondary trunk 200, the contacts 277, the wiper 274 and the engaged home contact in the associated contact bank, and the upper winding of the transfer relay R240. When the selector S100 has operated, in the manner previously explained, to select the trunk 210, ground potential is applied in the selector S100 to the control conductor C213 of the trunk 210, thereby to complete a circuit substantially identical to that traced above for energizing the upper winding of the transfer relay R240 in series with the rotary magnet M276 in the secondary trunk 200, whereby the transfer relay R240 operates. However, the rotary magnet M276 does not operate due to the high series resistance of the upper winding of the transfer relay R240. Also, when the selector S100 operated to select the trunk 210, in the manner previously explained, a loop circuit is completed between the calling subscriber substation T11 and the line relay R220 in the secondary trunk 200, which loop circuit extends from ground by way of the lower winding of the line relay R220 and the contacts 253 to the line conductor C212 of the trunk 210, and from battery by way of the upper winding of the line relay R220 and the contacts 251 to the line conductor C211 of the trunk 210; the line conductors C211 and C212 of the trunk 210 being terminated by contacts in the first section of the contact bank engaged by the line wipers 181*a* and 181*b* of the first wiper set of the Strowger mechanism 180 in the selector S100. Accordingly, the line relay R220 in the secondary trunk 200 operates to complete, at the contacts 221, a path, including the contacts 258, for operating the hold relay R230. Upon operating, the hold relay R230 completes, at the contacts 231, a multiple circuit for applying ground potential to the control conductor C213 of the trunk 210, thereby to maintain operated the transfer relay R240 in the secondary trunk 200 and the switch relay R150 in the selector 100. At this time the secondary trunk 200 is conditioned to respond to the next digit dialed at the calling subscriber substation T11. The subscriber at the calling subscriber substation T11 then dials the second digit X of the directory number of the called subscriber substation T31 in the remote exchange 30. It will, of course, be understood that the subscriber as the calling subscriber substation T11 merely operates the dial thereat, utilizing the eleventh digit finger hole therein, whereby the dial mentioned causes eleven impulses in a group to be transmitted therefrom over the subscriber line 15, the line switch 16, the trunk 100, the selector S100, and the trunk 210 to the line relay R220 in the secondary trunk 200, whereby the latter relay follows.

Each time the line relay R220 restores and then reoperates it interrupts and then recompletes, at the contacts 221, the previously traced circuit for maintaining operated the hold relay R230, whereby the latter relay being of the slow-to-release type is maintained operated during impulsing. Also, each time the line relay R220 restores and then reoperates it completes and then interrupts, at the contacts 222, a circuit, including the contacts 258, 233 and 243, for energizing the lower winding of the transfer relay R240, thereby to maintain the latter relay in its operated position during the reception of the present digit and after the wiper 274 of the hunt switch 270 disengages the home contact in the associated contact bank, interrupting the previously traced circuit for energizing the upper winding of the transfer relay R240 in series with the rotary magnet M276. Further, each time the line relay R220 restores and then reoperates it completes and then interrupts, at the contacts 222, a multiple circuit, including the contacts 258, 233, 243 and 244, for operating the rotary magnet M276 of the hunt switch 270. Accordingly, in the present example, the line relay R220 receives the eleven impulses of the second digit X, repeating them, at the contacts 222, to the rotary magnet M276, whereby the wipers noted of the hunt switch 270 are driven eleven steps in the clockwise direction away from their home positions. When the wipers 271, 272 and 273 of the hunt switch 270 are thus operated, they are driven across the group of nine trunks, including the trunk 281, extending to the operator switchboard 280 and into the group of fourteen trunk lines, including the trunk line 286, extending between the central office 10 and the remote exchange 30. At the conclusion of the second digit X the line relay R220 is maintained in its operated position, thereby to interrupt, at the contacts 222, the above-traced circuit for energizing the lower winding of the hold relay R240; and when the wiper 274 of the hunt switch 270 is driven one step in the clockwise direction away from its home position to disengage the home contact in the associated contact bank, it interrupts the previously traced circuit for energizing the upper winding of the transfer relay R240 in series with the rotary magnet M276; accordingly the transfer relay R240 restores shortly following the conclusion of the second digit X.

The operation of the hunt switch 270 to test the trunk lines extending between the central office 10 and the remote exchange 30 at the conclusion of the second digit X is the same as that previously explained, whereby the hunt switch 270 operates to select a trunk line in this group, in the event one of these trunk lines is idle at this time. The subscriber at the calling subscriber station T11 in the central office 10 then proceeds to dial the third and remaining digits of the directory number of the called subscriber substation T31 in the remote exchange 30, in order to bring about the completion of an established connection therebetween, in the manner previously explained. The release of this established connection between the calling subscriber substation T11 in the central office 10 and the called subscriber substation T31 in the remote exchange 30 is under the control of the subscriber at the calling subscriber substation T11 and is brought about when the receiver of the telephone instrument thereat is returned to its associated switchhook, as previously explained.

It is again noted that in the event all of the trunk lines extending between the central office 10 and the remote exchange 30 are busy at the conclusion of the second digit X, the hunt switch 270, after testing all of the trunk lines mentioned, is returned to its home position. Subsequently, the hunt switch 270 responds to the third digit of the directory number of the called subscriber substation T31 in the remote exchange 30 that is dialed at the calling subscriber substation T11 in the central office 10, in order to bring about operation thereof to extend the connection to the operator switchboard 280, all in the manner previously explained.

Also, in view of the prior explanation of the extension of a connection from the calling subscriber substation T12 to the operator switchboard 280 in the central office 10, it will be understood that a connection may be extended in an identical manner from the calling subscriber substation T11 to the operator switchboard 280 in the central office 10; the subscriber at the calling subscriber substation T11 dialing the digits 9 and 0 comprising the directory number of the operator switchboard 280.

In view of the foregoing description of the extension of connections from the calling subscriber substations T12 and T11, respectively rendered non-restricted service and limited service, to the operator switchboard 280 in the central office 10, it will be understood that a call from a subscriber substation rendered restricted service, such, for example, as the subscriber substation T10, to the operator switchboard 280 in the central office 10 may be extended in an identical manner; the subscriber at the calling subscriber substation T10 dialing the two digits 9 and 0. Also, the subsequent release of this connection between the calling subscriber substation T10 and the operator switchboard 280 in the central office 10 is the same as that previously described.

The arrangement incorporated in the secondary trunk 200 for selectively operating the hunt switch 270 to extend calls to the remote exchange 30 and to the operator switchboard 280 in the central office 10, dependent upon the class of the calling subscriber substation in the central office 10 is disclosed and claimed in the copending divisional application of John Wicks, Serial No. 100,400, filed June 21, 1949.

*Conclusions*

In view of the foregoing it is apparent that there has been provided an automatic telephone system comprising subscriber substations rendered three different classes of service characterized by three different types of dialing apparatus at the respective classes of subscriber substations, and automatic switching apparatus selectively controllable in accordance with the types of dialing apparatus at the calling subscriber substations connected thereto, in order to render the three different classes of service mentioned.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including subscriber substations of first and second classes, automatic switching apparatus accessible to said subscriber substations, and a trunk circuit provided with first and second channels accessible to said switching apparatus; each of said subscriber substations of said first class being provided with digit transmitting mechanism capable of a standard operation to transmit a first control, each of said subscriber substations of said second class being provided with digit transmitting mechanism capable of a standard operation to transmit a second control, means governed by said standard operations performed at calling ones of said subscriber substations and selectively responsive to said first and second controls for selectively operating said switching apparatus to extend connections over corresponding ones of said channels to said trunk circuit, and means selectively responsive to the extension of connections over said first and second channels to said trunk circuit for rendering to the connected calling ones of said subscriber substations corresponding first and second classes of service.

2. In a telephone system including subscriber substations of first and second classes, automatic switching apparatus accessible to said subscriber substations, and a trunk circuit provided with first and second channels accessible to said switching apparatus; each of said subscriber substations of said first class being provided with digit transmitting mechanism capable of a standard operation to transmit a digit X that is greater than 0, each of said subscriber substations of said second class being provided with digit transmitting mechanism capable of a standard operation to transmit a digit Y that is greater than X, means governed by said standard operations performed at calling ones of said subscriber substations and selectively responsive to said digits X and Y for selectively operating said switching apparatus to extend connections over corresponding ones of said channels to said trunk circuit, and means selectively responsive to the extension of connections over said first and second channels to said trunk circuit for rendering to the connected calling ones of said subscriber substations corresponding first and second classes of service.

3. In a telephone system including a plurality of first subscriber substations, a plurality of second subscriber substations, automatic switching apparatus accessible to said subscriber substations, and a trunk circuit provided with first and second channels accessible to said switching apparatus; means responsive to the performance of a standard operation at a calling one of said first subscriber substations for operating said switching apparatus to extend a connection over said first channel to said trunk circuit and responsive to the performance of said same standard operation at a calling one of said second subscriber substations for operating said switching apparatus to extend a connection over said second channel to said trunk circuit, and means selectively responsive to the extension of connections over said first and second channels to said trunk circuit for rendering to the connected calling ones of said subscriber substations corresponding first and second classes of service.

4. In a telephone system including subscriber substations of first and second classes, an automatic switch accessible to said subscriber substations and provided with first and second wiper sets, and a trunk commonly accessible to said wiper sets; each of said subscriber substations of said first class being provided with digit transmitting mechanism capable of a standard operation to transmit a first control, each of said subscriber substations of said second class being provided with digit transmittng mechanism capable of a standard operation to transmit a second control, means governed by said standard operations performed at calling ones of said subscriber substations and selectively responsive to said first and second controls for selectively operating said switch to extend connections over corresponding ones of said wiper sets to said trunk, and means selectively responsive to the extension of connections over said first and second wiper sets to said trunk for rendering to the connected calling ones of said subscriber substations corresponding first and second classes of service.

5. In a telephone system including subscriber substations of first and second classes, an automatic switch accessible to said subscriber substations and provided with first and second wiper sets, and a trunk commonly accessible to said wiper sets; each of said subscriber substations of said first class being provided with digit transmitting mechanism capable of a standard operation to transmit a digit X that is greater than 0, each of said subscriber substations of said second class being provided with digit transmitting mechanism capable of a standard operation to transmit a digit Y that is greater than X, means governed by said standard operations performed at calling ones of said subscriber substations and selectively responsive to said digits X and Y for selectively operating said switch to extend connections over corresponding ones of said wiper sets to said trunk, and means selectively responsive to the extension of connections over said first and second wiper sets to said trunk for rendering to the connected calling ones of said subscriber substations corresponding first and second classes of service.

6. In a telephone system including a plurality of first subscriber substations, a plurality of second subscriber substations, an automatic switch accessible to said subscriber substations and provided with first and second wiper sets, and a trunk commonly accessible to said wiper sets; means responsive to the performance of a standard operation at a calling one of said first subscriber substations for operating said switch to extend a connection over said first wiper set to said trunk and responsive to the performance of said same standard operation at a calling one of said second subscriber substations for operating said switch to extend a connection over said second wiper set to said trunk, and means selectively responsive to the extension of connections over said first and second wiper sets to said trunk for rendering to the connected calling ones of said subscriber substations corresponding first and second classes of service.

7. In a telephone system including subscriber substations of first and second classes, an automatic switch accessible to said subscriber substations and provided with first and second wiper sets, and a trunk circuit provided with first and second channels respectively accessible to said first and second wiper sets; each of said subscriber substations of said first class being provided with digit transmitting mechanism capable of a standard operation to transmit a first control, each of said subscriber substations of said second class being provided with digit transmitting mechanism capable of a standard operation to transmit a second control, means governed by said standard operations performed at calling ones of said subscriber substations and selectively responsive to said first and second controls for selectively operating said switch to extend connections over corresponding ones of said wiper sets and corresponding ones of said channels to said trunk circuit, and means selectively responsive to the extension of connections over said first and second channels to said trunk circuit for rendering to the connected calling ones of said subscriber substations corresponding first and second classes of service.

8. In a telephone system including subscriber substations of first and second classes, an automatic switch accessible to said subscriber substations and provided with first and second wiper sets, and a trunk circuit provided with first and second channels respectively accessible to said first and second wiper sets; each of said subscriber substations of said first class being provided with digit transmitting mechanism capable of a standard operation to transmit a digit X that is greater than 0, each of said subscriber substations of said second class being provided with digit transmitting mechanism capable of a standard operation to transmit a digit Y that is greater than X, means governed by said standard operations performed at calling ones of said subscriber substations and selectively responsive to said digits X and Y for selectively operating said switch to extend connections over corresponding ones of said wiper sets and corresponding ones of said channels to said trunk circuit, and means selectively responsive to the extension of connections over said first and second channels to said trunk circuit for rendering to the connected calling ones of said subscriber substations corresponding first and second classes of service.

9. In a telephone system including subscriber substations of first and second classes, a first automatic switch accessible to said subscriber substations, a second automatic switch accessible to said first switch, and a trunk accessible to said first switch; each of said subscriber substations of said first class being provided with digit transmitting mechanism capable of a standard operation to transmit a digit X that is greater than 0, each of said subscriber substations of said second class being provided with digit transmitting mechanism capable of a standard operation to transmit a digit Y that is greater than X, means responsive to the digit 0 for operating said first switch to select said second switch and responsive to the digits X or Y for operating said first switch to select said trunk, and means selectively responsive to the digits X and Y for rendering to the calling ones of said subscriber substations connected to said first switch corresponding first and second classes of service over said trunk.

10. In a telephone system including subscriber substations of first and second classes, a first automatic switch accessible to said subscriber substations and provided with three wiper sets, a second automatic switch accessible to a first of said wiper sets, and a trunk accessible to a second and a third of said wiper sets; each of said subscriber substations of said first class being provided with digit transmitting mechanism capable of a standard operation to transmit a digit X that is greater than 0, each of said subscriber substations of said second class being provided with digit transmitting mechanism capable of a standard operation to transmit a digit Y that is greater than X, means responsive to the digits 0 or X or Y for operating said first switch to cause said first wiper set to select said second switch and to cause said second and third wiper sets to select said trunk, additional means selectively responsive to the digits 0 and X and Y for extending connections respectively over said first and second and third wiper sets, and means selectively responsive to the extension of connections over said second and third wiper sets to said trunk for rendering to the calling ones of said subscriber substations connected to said first switch corresponding first and second classes of service.

JOHN WICKS.

REFERENCES CITED

The following references are of record in the file of this patent:

UNITED STATES PATENTS

| Number | Name | Date |
|---|---|---|
| 1,238,130 | Goodrum | Aug. 28, 1917 |
| 1,505,963 | Lomax | Aug. 26, 1924 |
| 1,649,496 | Smith | Nov. 15, 1927 |
| 1,859,885 | Paine | May 24, 1932 |
| 1,923,668 | Gillings et al. | Aug. 22, 1933 |
| 2,013,171 | Peterson | Sept. 3, 1935 |
| 2,042,561 | Stokley | June 2, 1936 |
| 2,291,496 | Newstedt | July 28, 1942 |
| 2,333,039 | Peterson | Oct. 26, 1943 |